United States Patent
Maruoka et al.

(10) Patent No.: US 10,494,469 B2
(45) Date of Patent: Dec. 3, 2019

(54) COMPOSITION FOR POLYURETHANE FOAM, PREPARATION FOR POLYURETHANE FOAM, POLYMER POLYOL PREPARATION FOR POLYURETHANE FOAM, PRODUCTION PROCESSES THEREFOR, AND POLYURETHANE FOAM

(75) Inventors: Yusuke Maruoka, Chiba (JP); Atsushi Miyata, Chiba (JP); Kazuhiko Okubo, Tokyo (JP); Tsukuru Izukawa, Tokyo (JP); Toru Hiraide, Yamaguchi (JP); Shinsuke Matsumoto, Chiba (JP)

(73) Assignee: MITSUI CHEMICALS & SKC POLYURETHANES INC., Tokyo (JP)

(*) Notice: Subject to any disclaimer, the term of this patent is extended or adjusted under 35 U.S.C. 154(b) by 0 days.

(21) Appl. No.: 14/234,457

(22) PCT Filed: Jul. 23, 2012

(86) PCT No.: PCT/JP2012/068587
§ 371 (c)(1),
(2), (4) Date: Jan. 23, 2014

(87) PCT Pub. No.: WO2013/015242
PCT Pub. Date: Jan. 31, 2013

(65) Prior Publication Data
US 2014/0155506 A1  Jun. 5, 2014

(30) Foreign Application Priority Data

Jul. 26, 2011  (JP) .................. 2011-163130

(51) Int. Cl.
| | | |
|---|---|---|
| C08G 18/32 | (2006.01) | |
| C08L 71/02 | (2006.01) | |
| C08G 18/63 | (2006.01) | |
| C08G 18/48 | (2006.01) | |
| C08G 18/66 | (2006.01) | |
| C08G 101/00 | (2006.01) | |
| C08G 18/08 | (2006.01) | |
| C08J 9/00 | (2006.01) | |
| C08G 18/76 | (2006.01) | |
| C08G 65/26 | (2006.01) | |
| C08J 9/02 | (2006.01) | |
| C08J 9/12 | (2006.01) | |
| C08J 9/38 | (2006.01) | |
| C08G 18/40 | (2006.01) | |

(52) U.S. Cl.
CPC ......... *C08G 18/3203* (2013.01); *C08G 18/14* (2013.01); *C08G 18/3206* (2013.01); *C08G 18/3271* (2013.01); *C08G 18/4072* (2013.01); *C08G 18/4841* (2013.01); *C08G 18/632* (2013.01); *C08G 18/667* (2013.01); *C08G 18/6677* (2013.01); *C08G 18/7621* (2013.01); *C08G 18/7664* (2013.01); *C08G 65/2675* (2013.01); *C08J 9/0023* (2013.01); *C08J 9/0028* (2013.01); *C08J 9/0033* (2013.01); *C08J 9/0038* (2013.01); *C08J 9/0061* (2013.01); *C08J 9/02* (2013.01); *C08J 9/122* (2013.01); *C08J 9/38* (2013.01); *C08L 71/02* (2013.01); *C08G 2101/0008* (2013.01); *C08G 2101/0083* (2013.01); *C08J 2201/022* (2013.01); *C08J 2203/06* (2013.01); *C08J 2203/08* (2013.01); *C08J 2205/05* (2013.01); *C08J 2205/06* (2013.01); *C08J 2375/08* (2013.01); *C08J 2425/12* (2013.01); *C08J 2433/20* (2013.01)

(58) Field of Classification Search
CPC ...... C08G 65/2675; C08G 18/32–4895; C08K 5/5399; C08J 9/0028; C08J 9/0038
See application file for complete search history.

(56) References Cited

U.S. PATENT DOCUMENTS

| | | | | |
|---|---|---|---|---|
| 4,265,783 A | * | 5/1981 | Hinze | .............. 252/182.27 |
| 5,472,987 A | * | 12/1995 | Reedy | ............ C08J 9/0061 |
| | | | | 516/13 |
| 5,770,635 A | * | 6/1998 | Lee | ............ C08G 18/089 |
| | | | | 521/115 |
| 6,207,794 B1 | | 3/2001 | Matsumoto | |
| 6,410,676 B1 | | 6/2002 | Yamasaki et al. | |
| 6,531,566 B1 | | 3/2003 | Satake | |
| 8,772,405 B2 | | 7/2014 | Kobayashi | |
| 2005/0267228 A1 | * | 12/2005 | Andrew | ............ C08G 18/092 |
| | | | | 521/99 |
| 2010/0210768 A1 | | 8/2010 | Kobayashi | |
| 2012/0178840 A1 | | 7/2012 | Sasaki et al. | |
| 2014/0288238 A1 | | 9/2014 | Kobayashi | |

FOREIGN PATENT DOCUMENTS

| | | |
|---|---|---|
| EP | 0916686 A1 | 5/1999 |
| EP | 1041100 A1 | 10/2000 |

(Continued)

OTHER PUBLICATIONS

Machine Translation of JP10-036499A. Feb. 10, 1998.*

(Continued)

*Primary Examiner* — Stephen E Rieth
(74) *Attorney, Agent, or Firm* — Rankin, Hill & Clark LLP

(57) ABSTRACT

This invention relates to a preparation for a polyurethane foam and a polymer polyol preparation for a polyurethane foam, each of which exhibits high coloration and discoloration inhibition properties over a long period of time when stored, and to a composition for a polyurethane foam, which is excellent in storage stability and is preferable as a resin premix. The composition comprises (i) at least one polyol, (ii) a compound having a P=N bond, (iii) an antioxidant having a hydroxyphenyl group, (iv) at least an acid and/or its salt, (v) a catalyst for polyurethane foam production and (vi) a blowing agent.

11 Claims, No Drawings

(56) References Cited

FOREIGN PATENT DOCUMENTS

| | | |
|---|---|---|
| EP | 2194097 A1 | 6/2010 |
| JP | 51-101099 | 9/1976 |
| JP | 10-030023 | 2/1998 |
| JP | 10-036499 | 2/1998 |
| JP | 10036499 A * | 2/1998 |
| JP | 11060721 A * | 3/1999 |
| JP | 11-302352 | 11/1999 |
| JP | 11-315138 | 11/1999 |
| JP | 2000-017070 | 1/2000 |
| JP | 2000-344881 | 12/2000 |
| JP | 2001-106780 | 4/2001 |
| JP | 2005-002085 | 1/2005 |
| JP | 2005-194362 | 7/2005 |
| WO | 2011/043343 | 4/2011 |

OTHER PUBLICATIONS

Machine Translation of JP11-060721. Mar. 5, 1999.*
Machine Translation of JP11-060721A. Mar. 5, 1999 (Year: 1999).*
Extended European Search Report dated Jun. 30, 2015 issued in the corresponding European patent application No. 12817644.3.
International Search Report dated Sep. 18, 2012 filed in PCT/JP2012/068587.
Koidan, G. N. et al. "Methylation of the Phosphoryl Group by Methyl Iodide," Journal of General Chemistry of the USSR, 55, 1985, p. 1453.
Matsudaira, Nobutaka et al. "Polyurethane," Maki Shoten, 1960, pp. 134-137.
Matsuo, Hitoshi et al. "Functional Polyurethane," CMC publishing Co., Ltd., 1989, pp. 54-68.
Iwata, Kenji. "Polyurethane Resin Handbook," The Nikkan Kogyo Shimbun, Ltd. 1987, pp. 71-98.

* cited by examiner

COMPOSITION FOR POLYURETHANE FOAM, PREPARATION FOR POLYURETHANE FOAM, POLYMER POLYOL PREPARATION FOR POLYURETHANE FOAM, PRODUCTION PROCESSES THEREFOR, AND POLYURETHANE FOAM

TECHNICAL FIELD

The present invention relates to a composition for a polyurethane foam, a preparation for a polyurethane foam, a polymer polyol preparation for a polyurethane foam, production processes therefor, and a polyurethane foam.

More particularly, the present invention relates to a preparation for a polyurethane foam and a polymer polyol preparation for a polyurethane foam, each of which exhibits high coloration and discoloration inhibition properties over a long period of time when stored, and to a composition for a polyurethane foam, which is excellent in storage stability and is preferable as a resin premix.

BACKGROUND ART

Polyurethane foams have been widely used as heat insulating materials for electric refrigerators, freezers, cold storages, building material panels, etc. because of their excellent heat insulation performance, moldability and self-adhesion properties, and they have been widely used for interior trim materials, such as sheet cushions, sheet backs, headrests, armrests, instrument panels, door trims and ceiling materials of vehicles such as automobiles, bicycle saddles, air planes, sheet materials for railroad vehicles, furniture, bedding, and office supplies, such as cushioning materials of business chairs, because of their excellent cushioning properties.

Polyurethane foams are obtained by preparing a resin premix containing a polyol such as a polyoxyalkylene polyol or a polymer polyol (polymer-dispersed polyol), a catalyst for polyurethane foam production, a blowing agent, etc. and allowing this resin premix to react with a polyisocyanate. The polyoxyalkylene polyol is obtained by, for example, addition polymerization of an alkylene oxide compound onto an active hydrogen compound using a basic catalyst.

To the polyoxyalkylene polyol, a stabilizer such as an antioxidant is usually added for the purpose of preventing oxidation deterioration of the polyol or in order not to form a peroxide that inhibits reactivity of the catalyst for polyurethane foam production. Such a stabilizer is, for example, a phenol-based compound (see, for example, patent literature 1).

When a catalyst or an acid derived from the polyol is contained in a resin premix for a long period of time, various problems such that the resin premix is color-changed to yellow or brown with time, the component contained in the resin premix is crystallized and precipitated, and separation between an aqueous layer and an organic layer occurs in the resin premix are usually liable to take place. Further, when a large amount of the catalyst is contained in the resin premix, the catalyst has influence on the urethanation reaction during the production of a polyurethane foam, and as a result, there is a fear of difficult control of the reaction time or a fear of evil influence on the performance or the moldability of the foam.

The phenol-based compound is widely used as an additive added to a polyoxyalkylene polyol, but in general, it tends to be discolored under the basic conditions, particularly in a resin premix or a polyoxyalkylene polyol containing a basic catalyst used for polymerization.

On that account, in general, the polyoxyalkylene polyol containing the catalyst is not used as it is in the resin premix, and for example, it is commonly carried out to neutralize the catalyst contained in the polyoxyalkylene polyol with an acid or the like and to purify the polyoxyalkylene polyol to reduce the amount of the catalyst, the acid component, etc. to a certain level or lower, prior to use for the resin premix (patent literatures 2 to 5, etc.).

However, a removal step, a purification step, etc. are required, and the process is extremely complicated.

Therefore, development of a resin premix, which is capable of producing a urethane foam without any problem even if it contains a catalyst, an acid and a stabilizer such as an antioxidant and which is excellent in long-term storage stability, has been desired.

CITATION LIST

Patent Literature

Patent literature 1: Japanese Patent Laid-Open Publication No. 2005-194362
Patent literature 2: Japanese Patent Laid-Open Publication No. 1976-101099
Patent literature 3: Japanese Patent Laid-Open Publication No. 1998-30023
Patent literature 4: Japanese Patent Laid-Open Publication No. 2000-17070
Patent literature 5: Japanese Patent Laid-Open Publication No. 2001-106780

SUMMARY OF INVENTION

Technical Problem

The present invention is intended to solve such problems associated with the prior art as mentioned above, and it is an object of the present invention to provide a preparation for a polyurethane foam, a polymer polyol preparation for a polyurethane foam and a composition for a polyurethane foam, each of which can be inhibited from being colored or discolored over a long period of time when stored, does not bring about precipitation of crystal and separation between an aqueous layer and an organic layer, is excellent in storage stability and is preferable for a resin premix, and production processes for them.

Solution to Problem

In order to solve the above problems, the present inventors have earnestly studied, and as a result, they have found that since a specific composition for a polyurethane foam, a specific preparation for a polyurethane foam and a specific polymer polyol preparation for a polyurethane foam exhibit high coloration and discoloration inhibition properties over a long period of time when stored and are excellent in storage stability, they can be each stored for a long period of time as a resin premix that is prepared in the production of a polyurethane foam. Thus, the present inventors have accomplished the present invention.

That is to say, the composition for a polyurethane foam of the present invention is characterized by comprising:
(i) at least one polyol selected from a polyoxyalkylene polyol and a polymer polyol wherein polymer fine particles obtained by polymerizing a compound having an unsaturated bond are dispersed in the polyoxyalkylene polyol, (ii) a compound having a P=N bond, (iii) an antioxidant having a hydroxyphenyl group, (iv) at least one acid selected from the group consisting of an acyclic aliphatic monocarboxylic acid of 2 to 25 carbon atoms, a hydroxycarboxylic acid of 2 to 25 carbon atoms, a polycarboxylic acid of 20 to 60 carbon atoms, an aromatic monocarboxylic acid represented by the following formula (1), a sulfonic acid and an acid having a sulfuric acid ester group, or its salt, (v) a catalyst for polyurethane foam production, and (vi) a blowing agent,

[Chem. 1]

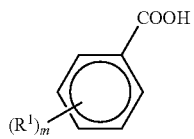

(1)

wherein $R^1$ is a hydrocarbon group, and m represents a number of hydrogen atoms of a benzene ring having been replaced with $R^1$ and is any one of 0 to 5.

The production process for a composition for a polyurethane foam is characterized by comprising a step which comprises adding, to a polyol (i) containing a polyoxyalkylene polyol (p) obtained by addition polymerization of an alkylene oxide compound onto an active hydrogen compound using the aforesaid compound (ii) as a catalyst, and the compound (ii) having been used for the production of the polyol (p), the aforesaid antioxidant (iii) and the aforesaid acid or its salt (iv) in such an amount that the molar ratio (a/b) of the acid or its salt (iv) (a) to the compound (ii) (b) having a P=N bond becomes not less than 0.3 but not more than 25, to obtain a preparation (c) for a polyurethane foam and then adding the aforesaid catalyst (V) for production and the aforesaid blowing agent (vi) to the preparation (c).

It is preferable that the production process for a composition for a polyurethane foam further comprises a step of preparing a polymer polyol in the preparation (c), and the polymer polyol is obtained by dispersing polymer fine particles obtained by polymerizing a compound having an unsaturated bond, in the preparation (c).

The polyurethane foam of the present invention is characterized by being obtained by the use of the composition for a polyurethane foam of the present invention.

Advantageous Effects of Invention According to the present invention, a composition for a polyurethane foam, which can be inhibited from being colored or discolored over a long period of time when stored, does not bring about precipitation of crystal and separation between an aqueous layer and an organic layer and is excellent in storage stability, can be obtained. The composition can be stored over a long period of time as a resin premix that is prepared in the production of a polyurethane foam.

Further, in the resin premix, deterioration of a polyoxyalkylene polyol is inhibited, and a polyurethane foam obtained by the use of the composition for a polyurethane foam of the present invention can maintain its favorable properties over a long period of time. Furthermore, a peroxide that inhibits reactivity of a catalyst for polyurethane foam production is rarely formed, and therefore, urethanation reactivity can be properly controlled in the production of a polyurethane foam. Moreover, the resulting polyurethane foam rarely causes a problem of yellowing or the like.

Moreover, when the composition of the present invention is produced, a crude polyol obtained by the use of a compound having a P=N bond as a catalyst can be used without purification, and therefore, the steps can be drastically omitted. On that account, environmental burden can be reduced, and the production cost can be also significantly reduced.

In addition, the preparation for a polyurethane foam and the polymer polyol preparation for a polyurethane foam exhibit high coloration and discoloration inhibition properties over a long period of time when stored and are excellent in storage stability.

DESCRIPTION OF EMBODIMENTS

[Composition for Polyurethane Foam, preparation for Polyurethane Foam and Polymer Polyol Preparation for Polyurethane Foam]

The composition for a polyurethane foam of the present invention contains at least (i) a specific polyol, (ii) a compound having a P=N bond, (iii) an antioxidant having a hydroxyphenyl group, (iv) a specific acid or its salt, (v) a catalyst for polyurethane foam production and (vi) a blowing agent, and contains other assistants when needed. The composition is preferable as a resin premix that is prepared in the production of a polyurethane foam.

The preparation for a polyurethane foam of the present invention (also referred to as a "preparation (c)") contains at least (p) a specific polyoxyalkylene polyol and/or a polymer polyol wherein polymer fine particles obtained by polymerizing a compound having an unsaturated bond are dispersed in the polyol, (ii) a compound having a P=N bond, which has been used for the production of the polyol (p), (iii) an antioxidant having a hydroxyphenyl group and (iv) a specific acid or its salt. The preparation (c) is preferable for the composition for a polyurethane foam.

The polymer polyol preparation for a polyurethane foam of the present invention (also referred to as a "preparation (pc)") contains the components contained in the preparation (c) of the present invention, and further contains a polymer polyol wherein polymer fine particles obtained by polymerizing a compound having an unsaturated bond are dispersed in the preparation (c). The preparation (pc) is preferable for the composition for a polyurethane foam.

<(i) Polyol>

In the composition for a polyurethane foam of the present invention, at least one polyol selected from the later-described polyoxyalkylene polyol and polymer-dispersed polyol is contained, and if necessary, other polyols may be contained.

In the present invention, the polyol (i) may contain a catalyst having been used for the production of a polyoxyalkylene polyol.

The amount of all the polyols contained in the composition for a polyurethane foam is usually 80 to 98% by mass, preferably 82 to 97% by mass, more preferably 85 to 96% by mass, based on 100% by mass of the composition.

The amount of the polyol (i) contained in the preparation (c) or the preparation (pc) is not specifically restricted as far as the effects of the present invention are exerted, but the amount thereof is usually 80.00 to 99.99% by mass, preferably 80.00 to 99.98% by mass, more preferably 90 to 99.98% by mass, based on 100% by mass of the preparation (c) or the preparation (pc).

(Polyoxyalkylene Polyol)

The polyoxyalkylene polyol related to the present invention is obtained by addition polymerization of an alkylene oxide compound onto an active hydrogen compound using a catalyst, such as the later described compound having a P=N bond, potassium hydroxide, cesium hydroxide or rubidium hydroxide. As the catalyst, the compound having a P=N bond is preferable from the viewpoints that the total degree of unsaturation at the time of completion of the addition polymerization can be more reduced and a polyoxyalkylene polyol can be efficiently produced and from the viewpoints that a small catalytic amount required for the polymerization is enough because of high activity per mol and the amount of the acid added can be decreased.

The polyoxyalkylene polyol is also preferably a polyol (p) obtained by the use of the acid or its salt (iv) in such an amount that the molar ratio (a/b) of the acid or its salt (iv) (a) to the compound (ii) (b) becomes a specific value and by the use of the antioxidant (iii) and the compound (ii) as a catalyst.

Although the hydroxyl value of the polyoxyalkylene polyol is not specifically restricted, it is preferably 10 to 80 mgKOH/g, more preferably 15 to 60 mgKOH/g, most preferably 18 to 40 mgKOH/g. A hydroxyl value of the above range is preferable because a polyurethane foam having optimum hardness, flexibility, mechanical strength, impact resilience, etc. and having optimum balance among them is obtained.

The total degree of unsaturation of the polyoxyalkylene polyol is not specifically restricted, but from the viewpoint of obtaining a general polyurethane foam, it is preferably not more than 0.050 meq/g, more preferably not more than 0.040 meq/g, still more preferably not more than 0.030 meq/g. Although the lower limit of the total degree of unsaturation is not specifically restricted, it is, for example, 0.001 meq/g. A total degree of unsaturation of the above range is preferable because the resulting polyurethane foam has good impact resilience and good wet heat permanent set (wet set).

Examples of the active hydrogen compounds include alcohols, phenols, polyamine, alkanolamine and thioalcohols. Specific examples thereof include:

water, dihydric alcohols, such as ethylene glycol, diethylene glycol, triethylene glycol, propylene glycol, dipropylene glycol, tripropylene glycol, 1,5-pentanediol, neopentyl glycol, 2-methyl-1,5-pentanediol, 2-ethyl-1,4-butanediol, 1,4-dimethylolcyclohexane, 1,3-propanediol, 1,4-cyclohexanediol, 1,3-butanediol, 1,4-butanediol, 1,6-hexanediol and 1,4-cyclohexanediol, alkanolamines, such as monoethanolamine, diethanolamine and triethanolamine, polyhydric alcohols, such as glycerol, diglycerol, triglycerol, tetraglycerol, trimethylolpropane, trimethylolethane, trimethylolbutane, ditrimethylolpropane, pentaerythritol, dipentaerythritol and tripentaerythritol, saccharides or their derivatives, such as glucose, sorbitol, dextrose, fructose, sucrose and methyl glycoside, aliphatic amines, such as ethylenediamine, di(2-aminoethyl)amine and hexamethylenediamine, aromatic amines, such as toluoylenediamine and diphenylmethanediamine, phenol compounds, such as bisphenol A, bisphenol F, bisphenol S, novolak, resol and resorcin, dihydric thioalcohols, such as ethylene thioglycol, propylene thioglycol, trimethylene thioglycol and butanedithiol, and alkylene thioglycols, such as diethylene thioglycol and triethylene thioglycol.

These active hydrogen compounds can be also used in combination of two or more kinds. Further, compounds obtained by addition polymerization of alkylene oxide compounds onto these active hydrogen compounds through a hitherto publicly known method can be also used.

Of these compounds, most preferable are dihydric alcohols, compounds having a number-average molecular weight of up to 2,000 obtained by addition polymerization of alkylene oxides onto dihydric alcohols, trihydric alcohols, compounds having a number-average molecular weight of up to 2,000 obtained by addition polymerization of alkylene oxides onto trihydric alcohols, tetrahydric alcohols, and compounds having a number-average molecular weight of up to 3,000 obtained by addition polymerization of alkylene oxides onto tetrahydric alcohols. Compounds having a number-average molecular weight of more than 2,000 after the addition of alkylene oxides onto dihydric alcohols or trihydric alcohols and compounds having a number-average molecular weight of more than 3,000 after the addition of alkylene oxides onto tetrahydric alcohols are undesirable because the amount of monools as by-products is increased.

Examples of the alkylene oxide compounds subjected to addition polymerization onto the active hydrogen compounds include propylene oxide, ethylene oxide, 1,2-butylene oxide, 2,3-butylene oxide, styrene oxide, cyclohexene oxide, epichlorohydrin, epibromohydrin, methyl glycidyl ether, allyl glycidyl ether and glycidol. These compounds may be used singly or in combination of two or more kinds.

Of these, preferable are propylene oxide, ethylene oxide, 1,2-butylene oxide, 2,3-butylene oxide and styrene oxide. More preferable are propylene oxide and ethylene oxide.

The temperature for the addition polymerization of the alkylene oxide compound onto the active hydrogen compound is preferably 15 to 150° C., more preferably 40 to 130° C., still more preferably 50 to 125° C.

The maximum pressure for the addition polymerization reaction of the alkylene oxide compound is preferably not more than 882 kPa. The addition polymerization of the alkylene oxide compound is carried out usually in a pressure reactor. The reaction of the alkylene oxide compound may be initiated under reduced pressure or may be initiated at atmospheric pressure. When the reaction is initiated at atmospheric pressure, the reaction is desirably carried out in the presence of an inert gas, such as nitrogen or helium. If the maximum reaction pressure for the reaction of the alkylene oxide compound exceeds 882 kPa, the amount of monools as by-products is liable to be increased.

As a method to feed an epoxide compound to the polymerization system, a method comprising feeding a part of the necessary amount of the alkylene oxide compound at once and feeding the residue continuously, a method of feeding all of the alkylene oxide compound continuously, or the like is used. In the method comprising feeding a part of the necessary amount of the alkylene oxide compound at once, it is preferable that the reaction temperature in the initial stage of the polymerization reaction of the alkylene oxide compound is set to a lower temperature in the aforesaid temperature range, and after feeding of the alkylene oxide compound, the reaction temperature is gradually raised.

In the addition polymerization reaction of the alkylene oxide compound, a solvent can be used when needed. Examples of the solvents include aliphatic hydrocarbons, such as pentane, hexane and heptane, ethers, such as diethyl ether, tetrahydrofuran and dioxane, and aprotic polar solvents, such as dimethyl sulfoxide and N,N-dimethylformamide. When a solvent is used, the solvent is desirably recovered and reused after the production in order not to increase the production cost of the polyoxyalkylene polyol.

(Polymer Polyol)

The polymer polyol (also referred to as a "polymer-dispersed polyol") related to the present invention can be obtained as a dispersion wherein vinyl polymer particles are dispersed in a polyoxyalkylene polyol by subjecting a compound having an unsaturated bond to dispersion polymerization in the polyoxyalkylene polyol using a radical initiator such as an azo compound or a peroxide. Although these vinyl polymer particles may be vinyl polymer particles made of a polymer of the compound having an unsaturated bond, they are preferably polymer particles wherein at least a part of the compound having an unsaturated bond is grafted on a specific polyol that is a dispersion medium during the dispersion polymerization.

Examples of the azo compounds include 2,2'-azobis(4-methoxy-2,4-dimethylvaleronitrile), 2,2'-azobis(2-methylbutyronitrile), 2,2'-azobis(isobutyronitrile) and dimethyl-2,2'-azobis(2-methyl propionate). Examples of the peroxides include benzoyl peroxide, t-butyl peroxide and di-t-butyl peroxide. Of these, the azo compounds are preferable, and 2,2'-azobis(isobutyronitrile) and dimethyl-2,2'-azobis(2-methyl propionate) are more preferable.

The compound having an unsaturated bond is a compound having an unsaturated bond in a molecule, and examples thereof include:

cyano group-containing monomers, such as acrylonitrile and methacrylonitrile, methacrylic acid ester-based monomers, such as methyl acrylate, butyl acrylate, stearyl acrylate, hydroxyethyl acrylate, hydroxymethyl methacrylate, hydroxyethyl methacrylate, hydroxypropyl methacrylate, dimethylaminoethyl acrylate and dimethylaminopropyl methacrylate, carboxyl group-containing monomers, such as acrylic acid, methacrylic acid, itaconic acid, maleic acid and fumaric acid, acid anhydride group-containing monomers, such as maleic anhydride and itaconic anhydride, hydrocarbon-based monomers, such as butadiene, isoprene and 1,4-pentadiene, aromatic hydrocarbon-based monomers, such as styrene, α-methylstyrene, phenylstyrene and chlorostyrene, halogen-containing monomers, such as vinyl chloride and vinylidene chloride, vinyl ethers, such as vinyl ethyl ether and vinyl butyl ether, vinyl ketones, such as vinyl ethyl ketone, vinyl esters, such as vinyl acetate, acrylamides, such as acrylamide, N,N-dimethylacrylamide, N-isopropylacrylamide, N,N-dimethylaminopropylacrylamide and methylenebisacrylamide, and methacrylamides, such as N,N-dimethylmethacrylamide.

Of these, acrylonitrile, styrene, methyl acrylate and hydroxyethyl methacrylate are preferable.

These compounds having an unsaturated bond can be used singly or as a mixture of two or more kinds.

In the production of the polymer polyol, a dispersion stabilizer, a chain transfer agent, etc. may be added in addition to the compound having an unsaturated bond.

Although the hydroxyl value of the polymer polyol is not specifically restricted, it is preferably 10 to 80 mgKOH/g, more preferably 15 to 60 mgKOH/g, most preferably 18 to 40 mgKOH/g. A hydroxyl value of the above range is preferable because a polyurethane foam having good flexibility and impact resilience is obtained.

When a polymer polyol is contained in the present invention, the total amount of the polymer polyol is usually 2 to 100% by mass, preferably 2 to 95% by mass, more preferably 5 to 80% by mass, based on 100% by mass of the total amount of all the polyol components. Although the content of the vinyl polymer particles in the polymer polyol is not specifically restricted, it is preferably 3 to 60% by mass, more preferably 5 to 50% by mass, still more preferably 8 to 45% by mass, based on 100% by mass of the total amount of the polymer polyol.

The polymer polyol can be also prepared by directly polymerizing the compound having an unsaturated bond in the preparation (c) of the present invention using the polyoxyalkylene polyol (p) contained in the preparation (c) and thereby dispersing the polymer fine particles. In this case, at least the compound (ii) having been used for the production of the polyol (p), the antioxidant (iii) and the acid or its salt (iv) are contained in the preparation (c), and therefore, the resulting preparation (pc) can be also inhibited from being colored or discolored over a long period of time when stored.

In the production of the polymer polyol, polymerization reaction is carried out using the polyoxyalkylene polyol, the compound having an unsaturated bond, the radical initiator, and if necessary, a chain transfer agent and a dispersion stabilizer. The polymerization reaction can be carried out batchwise or continuously. Although the polymerization temperature is determined according to the type of the polymerization initiator, it is not lower than the decomposition temperature of the polymerization initiator, preferably in the range of 60 to 200° C., more preferably 90 to 150° C. The polymerization reaction can be carried out under pressure or at atmospheric pressure. Although the polymerization reaction can be carried out in the absence of a solvent, the reaction can be also carried out in the presence of at least one solvent selected from water and an organic solvent, or a mixture of water and an organic solvent. Examples of the organic solvents include toluene, xylene, acetonitrile, hexane, heptane, dioxane, ethylene glycol dimethyl ether, N,N-dimethylformamide, methanol, butanol and isopropanol.

After the polymerization reaction is completed, the polymer polyol obtained can be used as it is as a raw material of polyurethane, but the polymer polyol is preferably used after the compound having an unsaturated bond, a decomposition product of the radical initiator, the chain transfer agent, the solvent, etc. are distilled off under reduced pressure.

The mean particle diameter of the polymer contained in the polymer polyol of the present invention is preferably 0.01 to 10 μm from the viewpoints of dispersion stability of the polymer and influence on the properties of the polyurethane. Such a particle diameter can be obtained by appropriately controlling the types and the amounts of the chain transfer agent, the dispersion stabilizer and the solvent, a weight composition ratio of the ethylenically unsaturated monomer, etc.

(Other Polyols)

In the composition for a polyurethane foam of the present invention, other polyols generally used for producing polyurethane foams may be contained when needed, in addition to the polyoxyalkylene polyol and/or the polymer polyol. Examples of other polyols include polyester polyol, polyether ester polyol and polycarbonate polyol.

Examples of the polyester polyols include condensates of low-molecular polyols and carboxylic acids, lactone-based polyols, such as ε-caprolactone ring-opened polymer and β-methyl-δ-valerolactone ring-opened polymer, and hydroxycarboxylic acid-based polyols, such as polylactic acid and polyricinoleic acid.

Examples of the low-molecular polyols include dihydric alcohols of 2 to 10 carbon atoms, such as ethylene glycol and propylene glycol, trihydric alcohols of 2 to 10 carbon atoms, such as glycerol, trimethylolpropane and trimethylolethane, tetrahydric alcohols, such as pentaerythritol and diglycerol, and saccharides, such as sorbitol and sucrose.

Examples of the carboxylic acids include dicarboxylic acids of 2 to 10 carbon atoms, such as succinic acid, adipic acid, maleic acid, fumaric acid, phthalic acid and isophthalic acid, and acid anhydrides of 2 to 10 carbon atoms, such as succinic anhydride, maleic anhydride and phthalic anhydride.

When other polyols are contained in the present invention, the content thereof is preferably less than 80% by mass, more preferably not more than 50% by mass, particularly preferably not more than 30% by mass, based on 100% by mass of all the polyol components.

<(ii) Compound Having P=N Bond>

The compound having a P=N bond (also referred to as a "compound (ii)") related to the present invention is not specifically restricted provided that it can be used as a catalyst for producing a polyoxyalkylene polyol contained in the polyol, and examples of such compounds include a phosphazenium compound, a phosphine oxide compound and a phosphazene compound.

In the present invention, the content ratio of the compound (ii) contained in the polyol (p) is not specifically restricted as far as the effects of the present invention are exerted, but when the content ratio is calculated from the charge of each component, the lower limit is preferably 150 ppm, more preferably 200 ppm, still more preferably 300 ppm, and the upper limit is preferably 5000 ppm, more preferably 3000 ppm, still more preferably 2000 ppm.

In the present invention, the content ratio of the compound (ii) contained in the preparation (c) for a polyurethane foam is not specifically restricted as far as the effects of the present invention are exerted, but when the content ratio is calculated from the charge of each component, the lower limit is preferably 50 ppm, more preferably 100 ppm, still more preferably 200 ppm, and the upper limit is preferably 3000 ppm, more preferably 2500 ppm, still more preferably 2000 ppm.

In the present invention, the content ratio of the compound (ii) contained in the composition for a polyurethane foam is not specifically restricted as far as the effects of the present invention are exerted, but when the content ratio is calculated from the charge of each component, the lower limit is preferably 50 ppm, more preferably 100 ppm, still more preferably 200 ppm, and the upper limit is preferably 3000 ppm, more preferably 2500 ppm, still more preferably 2000 ppm.

The content ratio of the compound (ii) contained in the polyol (p) or the preparation (c) for a polyurethane foam or the composition for a polyurethane foam can be also determined by a capillary electrophoresis method, a method using a trace total nitrogen analyzer, a 1H-NMR method or the like.

The upper limit of the ratio (a/b) of the total number of moles (a) of the later-described acid or its salt to the number of moles (b) of the compound (ii) having a P=N bond is preferably 25, more preferably 15, still more preferably 10, most preferably 8, and the lower limit thereof is preferably 0.3, more preferably 0.5, still more preferably 0.8, because coloration and discoloration inhibition properties of the polyoxyalkylene polyol composition are good and the reactivity of the urethanation reaction is stabilized. The compound (ii) is preferably contained in the composition for a polyurethane foam or the preparation (c or pc) in such an amount that the above-mentioned ratio is obtained.

When an aliphatic carboxylic acid is used as the acid or its salt (iv), the molar ratio (a/b) is preferably 5 to 25, more preferably 8 to 23, still more preferably 10 to 22. In the case of an acid other than the aliphatic carboxylic acid, the molar ratio (a/b) is preferably 0.3 to 13, more preferably 0.5 to 11, still more preferably 0.8 to 8.

In the present invention, the polyol (i) containing the polyol (p) and the compound (ii) can be used for the preparation (c) for a polyurethane foam, as it is, without removing the compound (ii) having been used for the production of the polyoxyalkylene poly (p). In this case, as the molar ratio (a/b), the ratio of the number of moles of the acid or its salt (iv) added to the preparation (c) to the number of moles of the compound (ii) having been used for the production of the polyol (p) is preferably in the above range.

Examples of the phosphazenium compounds include a compound represented by the following chemical formula (2) and a compound represented by the following chemical formula (3).

[Chem. 2]

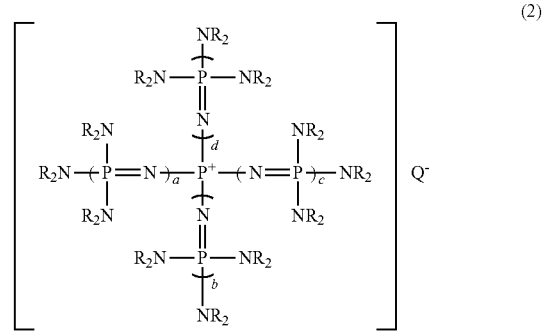

(2)

In the formula (2), a, b, c and d are each a positive number of 0 to 3 but there is no case where all of a, b, c and d become 0 at the same time. Each R is the same or different hydrocarbon group of 1 to 10 carbon atoms, and two R on the same nitrogen atom may be bonded to each other to form a cyclic structure. $Q^-$ represents a hydroxyl anion, an alkoxy anion, an aryloxy anion or a carboxy anion.

[Chem. 3]

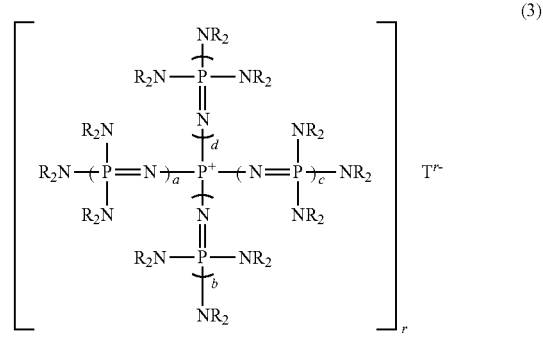

(3)

In the formula (3), a, b, c and d are each a positive number of 0 to 3 but there is no case where all of a, b, c and d become 0 at the same time. Each R is the same or different hydrocarbon group of 1 to 10 carbon atoms, and two R on the same nitrogen atom are sometimes bonded to each other to form a cyclic structure. r is an integer of 1 to 3 and represents a number of phosphazenium cations. $T^{r-}$ represents an inorganic anion having a valence of r.

Of these, the compound represented by the chemical formula (2) is preferable.

In the phosphazenium cation represented by the chemical formula (2) or the chemical formula (3), a, b, c and d are each a positive number of 0 to 3. However, there is no case where all of a, b, c and d become 0 at the same time. They are each preferably an integer of 0 to 2. More preferable are numbers in a combination of (2, 1, 1, 1), (1, 1, 1, 1), (0, 1, 1, 1), (0, 0, 1, 1) or (0, 0, 0, 1), regardless of the order of a, b, c and d. Still more preferable are numbers in a combination of (1, 1, 1, 1), (0, 1, 1, 1), (0, 0, 1, 1) or (0, 0, 0, 1).

In the phosphazenium cation represented by the chemical formula (2) or the chemical formula (3), each R is the same or different hydrocarbon group of 1 to 10 carbon atoms. Examples of R include aliphatic or aromatic hydrocarbon groups, such as methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (tert-octyl), nonyl, decyl, phenyl, 4-toluoyl, benzyl, 1-phenylethyl and 2-phenylethyl. Of these, preferable are aliphatic hydrocarbon groups of 1 to 10 carbon atoms, such as methyl, ethyl, n-propyl, isopropyl, tert-butyl, tert-pentyl and tert-octyl. More preferable is a methyl group or an ethyl group.

When two R on the same nitrogen atom in the phosphazenium cation are bonded to each other to form a cyclic structure, the divalent hydrocarbon group on the nitrogen atom is a divalent hydrocarbon group having a main chain constituted of 4 to 6 carbon atoms (the ring becomes 5- to 7-membered ring containing nitrogen atom). Preferable are, for example, tetramethylene, pentamethylene and hexamethylene. More preferable is a tetramethylene or pentamethylene group. A group wherein a main chain of the above group is substituted by an alkyl group such as methyl or ethyl is also available. All or a part of possible nitrogen atoms in the phosphazenium cation may take such a cyclic structure as above.

In the chemical formula (3), $T^{r-}$ represents an inorganic anion having a valence of r. r is an integer of 1 to 3. Examples of such inorganic anions include inorganic anions of boric acid, tetrafluoric acid, hydrocyanic acid, thiocyanic acid, hydrohalogenic acid, such as hydrofluoric acid, hydrochloric acid or hydrobromic acid, nitric acid, sulfuric acid, phosphoric acid, phosphorous acid, hexafluorophosphoric acid, carbonic acid, hexafluoroantimonic acid, hexafluorothallium acid and perchloric acid, and inorganic anions such as $HSO_4^-$ and $HCO_3^-$. These inorganic anions can exchange each other through ion exchange reaction. Of these inorganic anions, preferable are anions of inorganic acids, such as boric acid, tetrafluoroboric acid, hydrohalogenic acid, phosphoric acid, hexafluorophosphoric acid and perchloric acid, and more preferable is chlorine anion.

When the phosphazenium compound of the chemical formula (3) is used as a catalyst, it is necessary to prepare an alkali metal or alkaline earth metal salt of an active hydrogen compound in advance. The preparation process for the salt may be a publicly known process. The alkali metal or alkaline earth metal salt of an active hydrogen compound, which is allowed to coexist with the compound represented by the chemical formula (3), is a salt wherein active hydrogen of the active hydrogen compound dissociates into a hydrogen ion and the hydrogen ion is replaced with an alkali metal or alkaline earth metal ion.

Examples of preferred forms of the compounds represented by the chemical formula (2) include
tetrakis[tris(dimethylamino)phosphoranylideneamino]phosphonium hydroxide,
tetrakis[tris(dimethylamino)phosphoranylideneamino]phosphonium methoxide,
tetrakis[tris(dimethylamino)phosphoranylideneamino]phosphonium ethoxide, and
tetrakis[tri(pyrrolidin-1-yl)phosphoranylideneamino]phosphonium tert-butoxide.

The phosphine oxide compound is, for example, a compound represented by the following chemical formula (4).

[Chem. 4]

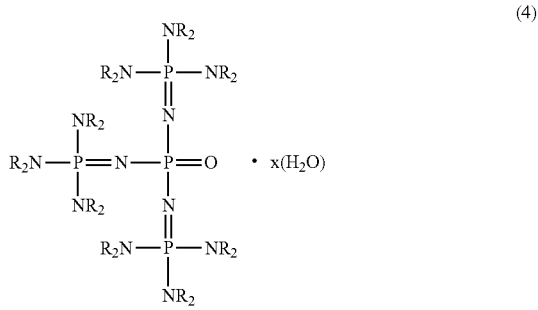

(4)

In the chemical formula (4), each R is the same or different hydrocarbon group of 1 to 10 carbon atoms. Examples of R include aliphatic or aromatic hydrocarbon groups, such as methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (common name: tert-octyl), nonyl, decyl, phenyl, 4-toluoyl, benzyl, 1-phenylethyl and 2-phenylethyl. R may be in the form of a pyrrolidino group or a piperidino group. Of these R, preferable are the same or different aliphatic hydrocarbon groups of 1 to 8 carbon atoms, such as methyl, ethyl, n-propyl, isopropyl, tert-butyl, tert-pentyl and 1,1-dimethyl-3,3-dimethylbutyl. More preferable is a methyl group or an ethyl group.

The phosphine oxide compound represented by the chemical formula (4) can be synthesized by the method described in "Journal of general chemistry of the USSR", 55, 1453 (1985) or a method analogous thereto. The phosphine oxide compound represented by the chemical formula (4) usually has hygroscopicity and tends to become a water-containing substance or a hydrate. x representing the amount of water molecules contained in the phosphine oxide compound is indicated by a molar ratio to the phosphine oxide compound, and x is 0 to 5, preferably 0 to 2. As a preferred form of the phosphine oxide compound, tris[tris(dimethylamino)phosphoranylideneamino]phosphine oxide or tris[tris(diethylamino)phosphoranylideneamino]phosphine oxide can be mentioned.

The phosphazene compound is, for example, a compound described in Japanese Patent Laid-Open Publication No.

1998-36499, and is specifically a compound represented by the following chemical formula (5).

[Chem. 5]

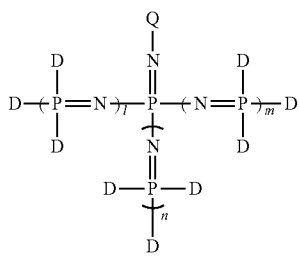

(5)

In the chemical formula (5), l, m and n are each a positive integer of 0 to 3.

In the chemical formula (5), Q is a hydrocarbon group of 1 to 20 carbon atoms, and examples thereof include:

alkyl groups, such as methyl, ethyl, propyl, isopropyl, n-butyl, isobutyl, sec-butyl, tert-butyl, pentyl, neopentyl, hexyl, heptyl, octyl, tert-octyl, nonyl and decyl, alkyl groups having an unsaturated bond or an aromatic group, such as allyl, 2-methylallyl, benzyl, phenethyl, o-anisyl, 1-phenylethyl, diphenylmethyl, triphenylmethyl and cinnamyl, alicyclic groups, such as cyclopentyl, cyclohexyl, 4-methylcyclohexyl, 3-propylcyclohexyl, 4-phenylcyclohexyl, cycloheptyl and 1-cyclohexenyl, alkenyl groups, such as vinyl, styzyl, propenyl, isopropenyl, 2-methyl-1-propenyl and 1,3-butadienyl, alkynyl groups, such as ethynyl and 2-propynyl, and aromatic groups, such as phenyl, o-tolyl, m-tolyl, p-tolyl, 2,3-xylyl, 2,4-xylyl, 3,4-xylyl, mesityl, o-cumenyl, m-cumenyl, p-cumenyl, 1-naphthyl, 2-naphthyl and p-methoxyphenyl.

In the chemical formula (5), each D is the same or different hydrocarbon group of 1 to 20 carbon atoms, an alkoxy group, a phenoxy group, a thiol residue, a thiophenol residue, a mono-substituted amino group, a di-substituted amino group or a cyclic amino group of a 5- to 6-membered ring.

Examples of the hydrocarbon groups of 1 to 20 carbon atoms as D include:

alkyl groups, such as methyl, ethyl, propyl, isopropyl, n-butyl, isobutyl, sec-butyl, tert-butyl, pentyl, neopentyl, hexyl, heptyl, octyl, tert-octyl, nonyl and decyl, alkyl groups having an unsaturated bond or an aromatic group, such as allyl, 2-methylallyl, benzyl, phenethyl, o-anisyl, 1-phenylethyl, diphenylmethyl, triphenylmethyl and cinnamyl, alicyclic groups, such as cyclopentyl, cyclohexyl, 4-methylcyclohexyl, 3-propylcyclohexyl, 4-phenylcyclohexyl, cycloheptyl and 1-cyclohexenyl, alkenyl groups, such as vinyl, styryl, propenyl, isopropenyl, 2-methyl-1-propenyl and 1,3-butadienyl, alkynyl groups, such as ethynyl and 2-propynyl, and aromatic groups, such as phenyl, o-tolyl, m-tolyl, p-tolyl, 2,3-xylyl, 2,4-xylyl, 3,4-xylyl, mesityl, o-cumenyl, m-cumenyl, p-cumenyl, 1-naphthyl, 2-naphthyl and p-methoxyphenyl.

Examples of the alkoxy groups as D include alkoxy groups containing 1 to 20 carbon atoms, such as methoxy, ethoxy, propoxy, isopropoxy, butoxy, pentyloxy, allyloxy, cyclohexyloxy and benzyloxy.

Examples of the phenoxy groups as D include phenoxy groups containing 6 to 20 carbon atoms, such as phenoxy, 4-methylphenoxy, 3-propylphenoxy and 1-naphthyloxy.

Examples of the thiol residues as D include thiol residues containing 1 to 20 carbon atoms, such as methylthio, ethylthio, propylthio, isopropylthio, butylthio, isobutylthio, tert-butylthio, pentylthio, hexylthio, heptylthio, octylthio, tert-octylthio, nonylthio and decylthio.

Examples of the thiophenol residues as D include thiophenol residues containing 6 to 20 carbon atoms, such as phenylthio, o-toluoylthio, m-toluoylthio, p-toluoylthio, 2,3-xylylthio, 2,4-xylylthio, 3,4-xylylthio, 4-ethylphenylthio and 2-naphthylthio.

Examples of the mono-substituted amino groups as D include mono-substituted amino groups containing 1 to 20 carbon atoms, such as methylamino, ethylamino, propylamino, isopropylamino, butylamino, isobutylamino, tert-butylamino, pentylamino, hexylamino, heptylamino, octylamino, tert-octylamino, nonylamino, decylamino, 1-ethylpropylamino, 1-ethylbutylamino, anilino, o-toluoylamino, m-toluoylamino, p-toluoylamino, 2,3-xylylinoamino, 2,4-xylylinoamino and 3,4-xylylinoamino.

Examples of the di-substituted amino groups as D include amino groups di-substituted by the same or different hydrocarbon groups of 1 to 20 carbon atoms, such as dimethylamino, diethylamino, methylethylamino, dipropylamino, methylpropylamino, diisopropylamino, dibutylamino, methylbutylamino, diisobutylamino, di-sec-butylamino, dipentylamino, dihexylamino, ethylhexylamino, diheptylamino, dioctylamino, di-tert-octylamino, ethyl-tert-octylamino, dinonylamino, didecylamino, diphenylamino, methylphenylamino, ethylphenylamino, di-o-toluoylamino, di-2,3-xylylamino and phenyltoluoylamino.

Examples of the cyclic amino groups of a 5- to 6-membered ring as D include 1-pyrrolidinyl, 3-methyl-1-pyrrolidinyl, 1-pyrrolyl, 3-ethyl-1-pyrrolyl, 1-indolyl, 1-piperidyl, 3-methyl-1-piperidyl, 1-piperazinyl, 4-methyl-1-piperazinyl, 1-imidazolidinyl and 4-morpholinyl.

All or a part of possible bonds formed by bonding of two D on the same phosphorus atom or on two different phosphorus atoms to each other may form a cyclic structure. As the divalent group (D—D) on the phosphorus atom in this case, a saturated or unsaturated aliphatic divalent hydrocarbon group, such as ethylene, vinylene, propylene, 1,2-cyclohexanylene, 1,2-phenylene, trimethylene, propenylene, tetramethylene, 2,2'-biphenylene, 1-butenylene, 2-butenylene or pentamethylene, can be mentioned.

Further, there can be mentioned a divalent group wherein into one or both of bonds between both ends of the above divalent group and phosphorus atoms is inserted arbitrary one or two atoms selected from the group consisting an oxygen atom, a sulfur atom and a nitrogen atom to which a hydrogen atom or an aliphatic or aromatic hydrocarbon group, such as methyl group, ethyl group, butyl group, cyclohexyl group, benzyl group or phenyl group, is bonded. Specific examples of such divalent groups include groups of methyleneoxy, ethylene-2-oxy, trimethylene-3-oxy, methylenedioxy, ethylenedioxy, trimethylene-1,3-dioxy, cyclohexane-1,2-dioxy, benzene-1,2-dioxy, methylenethio, ethylene-2-thio, trimethylene-3-thio, tetramethylene-4-thio, methylenedithio, ethylenedithio, trimethylene-1,3-dithio, iminomethylene, 2-iminoethylene, 3-iminotrimethylene, 4-iminotetramethylene, N-ethyliminomethylene, N-cyclohexyl-2-iminoethylene, N-methyl-3-iminotrimethylene, N-benzyl-4-iminotetramethylene, diiminomethylene, 1,2- diiminoethylene, 1,2-diiminovinylene, 1,3-diiminotrimethylene, N,N'-dimethyldiiminomethylene, N,N'-diphenyl-1,2-diiminoethylene, N,N'-dimethyl-1,2-diiminoethylene, N-methyl-N'-ethyl-1,3-diiminotrimethylene, N,N'-diethyl-1,4-diiminotetramethylene and N-methyl-1,3-diiminotrimethylene.

All or a part of possible bonds formed by bonding of D and Q to each other may form a cyclic structure, and as the divalent group (D-Q) to connect a nitrogen atom to a phosphorus atom in this case, there can be mentioned the same saturated or unsaturated aliphatic divalent hydrocarbon group as the aforesaid divalent group on the phosphorus atom or a divalent group wherein arbitrary one atom selected from the group consisting an oxygen atom, a sulfur atom and a nitrogen atom to which a hydrogen atom or an aliphatic or aromatic hydrocarbon group, such as methyl group, ethyl group, butyl group, cyclohexyl group, benzyl group or phenyl group, is bonded is inserted into the bond between the above divalent hydrocarbon group and the phosphorus atom. Specific examples of such divalent groups include groups of methyleneoxy, ethylene-2-oxy, methylenethio, ethylene-2-thio, iminomethylene, 2-iminoethylene, N-methyliminomethylene, N-ethyl-2-iminoethylene, N-methyl-3-iminotrimethylene and N-phenyl-2-iminoethylene.

Specific examples of the phosphazene compounds having a structure represented by the chemical formula (5) wherein each D is the same or different alkyl group include 1-tert-butyl-2,2,2-trimethylphosphazene and 1-(1,1,3,3-tetramethylbutyl)-2,2,4,4,4-pentaisopropyl-$2\lambda^5$, $4\lambda^5$-catenadi (phosphazene).

Examples of the compounds wherein D is an alkyl group having an unsaturated bond or an aromatic group include 1-tert-butyl-2,2,2-triallylphosphazene, 1-cyclohexyl-2,2,4,4,4-pentaallyl-$2\lambda^5$,$4\lambda^5$-catenadi(phosphazene) and 1-ethyl-2,4,4,4-tribenzyl-2-tribenzylphosphoranylideneamino-$2\lambda^5$, $4\lambda^5$-catenadi(phosphazene).

Examples of the compounds wherein D is an alicyclic group include 1-methyl-2,2,2-tricyclopentylphosphazene and 1-propyl-2,2,4,4-cyclohexyl-$2\lambda^5$,$4\mu^5$-catenadi(phosphazene).

Examples of the compounds wherein D is an alkenyl group include 1-butyl-2,2,2-trivinylphophazene and 1-tert-buty-2,2,4,4,4-pentastyryl-$2\lambda^5$, $4\lambda^5$-catenadi (phosphazene).

Examples of the compounds wherein D is an alkynyl group include 1-tert-butyl-2,2,2-tri(2-phenylethynyl)phosphazene. Examples of the compounds wherein D is an aromatic group include 1-isopropyl-2,4,4,4-tetraphenyl-2-triphenylphosphoranylideneamino-$2\lambda^5$, $4\lambda^5$-catenadi (phosphazene).

Examples of the compounds wherein D is an alkoxy group include 1-tert-butyl-2,2,2-trimethoxyphosphazene, 1-(1,1,3,3-tetramethylbutyl)-2,2,4,4,4-pentaisopropoxy-$2\lambda_5$,$4\lambda^5$-catenadi(phosphazene) and 1-phenyl-2,2,4,4,4-pentabenzyloxy-$2\lambda^5$,$4\lambda^5$-catenadi(phosphazene).

Examples of the compounds wherein D is a phenoxy group include 1-methyl-2,2,2-triphenoxyphosphazene and 1-tert-butyl-2,2,4,4,4-penta(1-naphthyloxy)-$2\lambda^5$, $4\lambda^5$-catenadi(phosphazene).

Examples of the compounds wherein D is a di-substituted amino group include 1-tert-butyl-2,2,2-tris(dimethylamino) phosphazene, 1-(1,1,3,3-tetramethylbutyl)-2,2,2-tris(dimethylamino)phosphazene, 1-ethyl-2,2,4,4,4-pentakis(dimethylamino)-$2\lambda^5$, $4\lambda^5$-catenadi (phosphazene), 1-tert-butyl-2,4,4,4-tetrakis(dimethylamino)-2-tris(dimethylamino) phosphoranylideneamino-$2\lambda^5$,$4\lambda^5$-catenadi(phosphazene), 1-tert-butyl-2,4,4,4-tetrakis(diisopropylamino)-2-tris(diisopropylamino)phosphoranylideneamino-$2\lambda^5$,$4\lambda^5$-catenadi (phosphazene), 1-tert-butyl-2,4,4,4-tetrakis(di-n-butylamino)-2-tris(di-n-butylamino)phosphoranylideneamino-$2\lambda^5$, $4\lambda^5$-catenadi(phosphazene), 1-tert-butyl-4,4,4-tris (dimethylamino)-2,2-bis[tris(dimethylamino) phosphoranylideneamino]-$2\lambda^5$,$4\lambda^5$-catenadi(phosphazene), 1-(1,1,3,3-tetramethylbutyl)-4,4,4-tris(dimethylamino)-2,2-bis[tris(dimethylamino)phosphoranylideneamino]-$2\lambda^5$,$4\lambda^5$-catenadi(phosphazene), 1-(1,1,3,3-tetramethylbutyl)-4,4,4-tris(methylethylamino)-2,2-bis[tris(methylethylamino) phosphoranylideneamino]-$2\lambda^5$,$4\lambda^5$-catenadi(phosphazene), 1-tert-butyl-4,4,4-tris(diethylamino)-2,2-bis[tris(diethylamino) phosphoranylideneamino]-$2\lambda^5$,$4\lambda^5$-catenadi(phosphazene), 1-tert-butyl-4,4,4-tris(diisopropylamino)-2,2-bis[tris(diisopropylamino)phosphoranylideneamino]-$2\lambda^5$,$4\lambda^5$-catenadi(phosphazene), 1-tert-butyl-4,4,4-tris(di-n-butylamino)-2,2-bis[tris(di-n-butylamino) phosphoranylideneamino]-$2\lambda^5$,$4\lambda^5$-catenadi(phosphazene), 1-tert-butyl-4,4,6,6,6-pentakis(dimethylamino)-2,2-bis[tris (dimethylamino)phosphoranylideneamino]-$2\lambda^5$,$4\lambda^5$,$6\lambda^5$-catenatri(phosphazene), 1-tert-butyl-4,4,6,6,6-pentakis(diethylamino)-2,2-bis[tris(diethylamino) phosphoranylideneamino]-$2\lambda^5$,$4\lambda^5$,$6\lambda^5$-catenatri (phosphazene), 1-tert-butyl-4,4,6,6,6-pentakis (diisopropylamino)-2,2-bis[tris(diisopropylamino) phosphoranylideneamino]-$2\lambda^5$, $4\lambda^5$, $6\lambda^5$-catenatri (phosphazene), 1-tert-butyl-4,4,6,6,6-pentakis (di-n-butylamino)-2,2-bis[tris(di-n-butylamino) phosphoranylideneamino]-$2\lambda^5$, $4\lambda^5$, $6\lambda^5$-catenatri (phosphazene), 1-tert-butyl-4,4,6,6,6-pentakis (dimethylamino)-2-[2,2,2-tris(dimethylamino)phosphazen-1-yl]-2-[2,2,4,4,4-pentakis(dimethylamino)-$2\lambda^5$,$4\lambda^5$-catenadi (phosphazen)-1-yl]-$2\lambda^5$,$4\lambda^5$,$6\lambda^5$-catenatri (phosphazene) and 1-phenyl-2,2-bis(dimethylamino)-4,4-dimethoxy-4-phenylamino-$2\lambda^5$, $4\lambda^5$-catenadi (phosphazene).

Examples of the compounds wherein two D on the same phosphorus atom or on two different phosphorus atoms are bonded to each other to form a cyclic structure include 2-(tert-butylimino)-2-dimethylamino-1,3-dimethyl-1,3-diaza-$2\lambda^5$-phosphinane.

Examples of preferred forms of the phosphazene compounds include 1-tert-butyl-2,2,2-tris(dimethylamino)phosphazene, 1-(1,1,3,3-tetramethylbutyl)-2,2,2-tris(dimethylamino)phosphazene, 1-ethyl-2,2,4,4,4-pentakis (dimethylamino)-$2\lambda^5$,$4\lambda_5$-catenadi(phosphazene), 1-tert-butyl-4,4,4-tris(dimethylamino)-2,2-bis[tris (dimethylamino)phosphoranylideneamino]-$2\lambda^5$, $4\lambda^5$-catenadi(phosphazene), 1-(1,1,3,3-tetramethylbutyl)-4,4,4-tris(dimethylamino)-2,2-bis[tris(dimethylamino) phosphoranylideneamino]-$2\lambda^5$,$4\lambda^5$-catenadi (phosphazene), 1-tert-butyl-2,2,2-tri(1-pyrrolidinyl)phosphazene and 7-ethyl-5,11-dimethyl-1,5,7,11-tetraaza-$6\lambda^5$-phosphaspiro [5,5]undec-1(6)-ene.

Of the compounds (ii), preferable are phosphazenium compounds, more preferable are compounds represented by the chemical formula (2), and still more preferable is tetrakis [tris(dimethylamino)phosphoranylideneamino]phosphonium hydroxide in the present invention, from the viewpoints of long-term storage stability of a resin premix, coloration and discoloration inhibition properties of a resin premix during storage, and industrially effective utilization of a catalyst.

<(iii) Antioxidant Having Hydroxyphenyl Group>

In the composition of the present invention, an antioxidant having a hydroxyphenyl group is contained for the purpose of preventing deterioration of polyols such as polyoxyalkylene polyol and polymer polyol. In the present invention, this antioxidant is sometimes referred to as an "antioxidant (iii)".

When an antioxidant having a hydroxyphenyl group, such as BHT, is used in the production of a general polyoxyalkylene polyol, there is usually a problem that an antioxidant itself is liable to undergo structural change under the basic conditions to cause coloration and discoloration.

However, it has been found that even if the composition for a polyurethane foam contains a polyol and a compound having a P=N bond, the reactivity of the composition does not change even in the storage of the composition for a long time and the storage stability becomes good in the present invention, particularly by the use of the antioxidant together with the later-described acid or its salt related to the present invention. Although the reason is not clear, it is presumed that by the use of a combination of specific acid and antioxidant or by the use of specific acid, antioxidant, polyol and compound having a P=N bond, the compounds in the composition for a polyurethane foam are stably present and the maintenance of reactivity of the composition for a polyurethane foam over a long period of time has succeeded.

It has been further found that even in the case of the preparation for a urethane foam of the present invention, coloration and discoloration during storage can be inhibited over a long time, and even when a resin premix is prepared by adding various additives related to urethane foams after storage of the preparation, the resin premix can be stably stored.

The content ratio of the antioxidant (iii) contained in the polyol (p) of the present invention is not specifically restricted as far as the effects of the present invention are exerted, but when the content ratio is calculated from the charge of each component, the lower limit is 100 ppm, preferably 200 ppm, and the upper limit is 20000 ppm, preferably 15000 ppm.

The content ratio of the antioxidant (iii) contained in the preparation (c) of the present invention is not specifically restricted as far as the effects of the present invention are exerted, but when the content ratio is calculated from the charge of each component, it is preferably 100 to 15000 ppm, more preferably 200 to 10000 ppm, still more preferably 250 to 6000 ppm.

The content ratio of the antioxidant (iii) contained in the composition of the present invention is not specifically restricted as far as the effects of the present invention are exerted, but when the content ratio is calculated from the charge of each component, it is preferably 100 to 15000 ppm, more preferably 200 to 10000 ppm, still more preferably 250 to 6000 ppm.

It is also possible to determine the content ratio of the antioxidant (iii) contained in the polyol (p), the preparation (c) or the composition of the present invention by properly combining NMR method, gas chromatography, liquid chromatography and mass spectrometry.

Examples of the antioxidants include BHT (3,5-di-tert-butyl-4-hydroxytoluene), pentaerythrityl-tetrakis-3-(3,5-di-tert-butyl-4-hydroxyphenyl)propionate (also referred to as "Irganox 1010"), octadecyl-3-(3,5-di-tert-butyl-4-hydroxyphenyl)propionate (also referred to as "Irganox 1076"), 2-tert-butyl-4-ethylphenol, 2,6-di-tert-butyl-4-ethylphenol, triethylene glycol-bis[3-(3-t-butyl-5-methyl-4-hydroxyphenyl)propionate], stearyl-3-(3,5-di-t-butyl-4-hydroxyphenyl) propionate, 2,2-thio-diethylenebis[3-(3,5-di-t-butyl-4-hydroxyphenyl)propionate], isooctyl-3-(3,5-di-t-butyl-4-hydroxyphenyl)propionate (also referred to as "Irganox 1135"), 1,3,5-trimethyl-2,4,6-tris[(3,5-di-t-butyl-4-hydroxyphenyl)methyl]benzene, 1,3,5-tris(3,5-di-t-butyl-4-hydroxyphenyl)methyl isocyanurate, 1,3,5-tris[(4-t-butyl-3-hydroxy-2,6-dimethylphenyl)methyl]isocyanurate, 1,1,3-tris(2-methyl-4-hydroxy-5-t-butylphenyl)butane, 2,2'-methylenebis(4-methyl-6-t-butylphenol) and 3,9-bis[2-{3-(3-t-butyl-4-hydroxy-5-methylphenyl)propionyloxy}-1,1-dimethylethyl]-2,4,8,10-tetraoxaspiro[5,5]undecane. Of these, antioxidants having t-butyl group-substituted hydroxyphenyl group are preferable, and for the reason of solubility in the composition for a polyurethane foam, antioxidant performance, etc., BHT, Irganox 1010, Irganox 1076 and Irganox 1135 are more preferable.

These antioxidants may be used singly or in combination of two or more kinds.

<(iv) Acid or its Salt>

In the composition of the present invention, at least one acid selected from the group consisting of an acyclic aliphatic monocarboxylic acid of 2 to 25 carbon atoms, a hydroxycarboxylic acid of 2 to 25 carbon atoms, a polycarboxylic acid of 20 to 60 carbon atoms, an aromatic monocarboxylic acid represented by the aforesaid formula (1), a sulfonic acid and an acid having a sulfuric acid ester group, or its salt is contained. In the present invention, these are sometimes referred to as "acids or their salts (iv)").

When inorganic acids (mineral acids), such as hydrochloric acid, nitric acid, nitrous acid, sulfuric acid, boric acid, hydrofluoric acid, phosphoric acid, phosphorous acid, hypophosphorous acid and pyrophosphoric acid, or their salts are contained in a resin premix for a long period of time, crystals are usually liable to be precipitated, and the possibility of inhibiting the production of a polyurethane foam is high. Further, when the acids or their salts are used in the form of an aqueous solution or when a resin premix is prepared using water as the later-described blowing agent, they are usually liable to be separated in water, together with the compound having a P=N bond and hydrophilic components such as a catalyst for polyurethane foam production, and therefore, it is difficult to obtain a resin premix having storage stability.

In the case of the composition for a polyurethane foam of the present invention, however, crystals are not precipitated, and besides, a resin premix can have storage stability over a long period of time without bringing about separation between an aqueous layer and an organic layer. Moreover, it has been found that by the use of the acid or its salt together with the antioxidant related to the present invention, reactivity of the composition for a polyurethane foam does not change even when the composition is stored for a long time, and the storage stability of the composition becomes good, as previously described. Although the reason for them is not clear, it is presumed that by virtue of a combination of specific acid and antioxidant, the compounds in the composition for a polyurethane foam are stably present and the maintenance of reactivity of the composition over a long period of time has succeeded.

It is preferable that the acid or its salt (iv) of the present invention satisfies the ratio (a/b) thereof to the number of moles of the compound having a P=N bond, as previously described.

Examples of the acyclic aliphatic monocarboxylic acids of 2 to 25 carbon atoms, preferably 2 to 20 carbon atoms, and their salts include acetic acid, propionic acid, butyric acid, valeric acid, caproic acid, heptanoic acid, caprylic acid, pelargonic acid, capric acid, lauric acid, myristic acid, palmitic acid, stearic acid, and their salts.

Examples of the hydroxycarboxylic acids of 2 to 25 carbon atoms, preferably 2 to 20 carbon atoms, and their salts include lactic acid, malic acid, tartaric acid, citric acid, ricinoleic acid, and their salts.

Examples of the polycarboxylic acids of 20 to 60 carbon atoms, preferably 25 to 55 carbon atoms, and their salts include dimer acids (dimers of carboxylic acids of 18 carbon atoms) (Pripol 1009, Pripol 1006 and Pripol 1013 available from Croda Japan K.K.) and their salts. The dimer acids can be produced on the basis of, for example, the description of Japanese Patent Laid-Open Publication No. 2005-2085.

Examples of the aromatic monocarboxylic acids represented by the aforesaid formula (1) and their salts include benzoic acid, decylbenzoic acid, dodecylbenzoic acid, and their salts. In the formula (1), $R^1$ represents a hydrocarbon group. Examples of the hydrocarbon groups include methyl group, ethyl group, propyl group, isopropyl group, n-butyl group, isobutyl group, sec-butyl group, t-butyl group, n-pentyl group, isopentyl group, t-pentyl group, neopentyl group, hexyl group, isohexyl group, heptyl group, octyl group, nonyl group, decyl group and dodecyl group. $R^1$ is preferably a decyl group or a dodecyl group. m represents a number of hydrogen atoms of the benzene ring having been replaced with $R^1$, and is any one of 0 to 5, preferably 0 to 2.

Examples of the sulfonic acids and their salts include p-toluenesulfonic acid, alkylbenzenesulfonic acids such as dodecylbenzenesulfonic acid (including straight-chain type or branched type), benzenesulfonic acid, methanesulfonic acid, camphorsulfonic acid, and their salts.

Examples of the acids having sulfuric acid ester group and their salts include polyoxyalkylene alkenyl ether ammonium sulfate (Latemul PD-105 available from Kao Corporation) and polyoxyethylene styrenated phenyl ether ammonium sulfate (Latemul E-1000A available from Kao Corporation).

The salt is not specifically restricted as far as it can be neutralized with an acid and exerts the effects of the present invention. However, there can be mentioned, for example, alkali metal salts, such as lithium salt, sodium salt and potassium salt, alkaline earth metal salts, such as calcium salt, magnesium salt and barium salt, weakly basic salts, such as ammonium salt, amine salt and pyridinium salt, metal salts, such as copper salt and silver salt, and complex salts with copper. Preferable are weakly basic salts, such as ammonium salt, amine salt and pyridinium salt.

These acids may be in the form of acid anhydrides or hydrates as far as they exert the effects of the present invention.

Of these, preferable are lactic acid, malic acid, tartaric acid, citric acid, dimer acid, benzoic acid, decylbenzoic acid, dodecylbenzoic acid, p-toluenesulfonic acid, alkylbenzenesulfonic acids such as dodecylbenzenesulfonic acid (including straight-chain type or branched type), benzenesulfonic acid, methanesulfonic acid, camphorsulfonic acid, polyoxyalkylene alkenyl ether ammonium sulfate and polyoxyethylene styrenated phenyl ether ammonium sulfate, and more preferable are p-toluenesulfonic acid, alkylbenzenesulfonic acids such as dodecylbenzenesulfonic acid (including straight-chain type or branched type), benzenesulfonic acid, methanesulfonic acid and camphorsulfonic acid, because the ratio (a/b) of the total number of moles (a) of the acid or its salt to the number of moles (b) of the compound having a P=N bond necessary to obtain coloration and discoloration inhibition properties is small, that is, coloration and discoloration can be efficiently inhibited by the addition of a small amount of the acid, and there is no odor of the acid, etc.

These acids and their salts may be used singly or in combination or two or more kinds.

<(v) Catalyst for Polyurethane Foam Production>

The catalyst for polyurethane foam production (also referred to as a "catalyst (v) for production") related to the present invention is not specifically restricted provided that it can be used for the reaction of a polyol with a polyisocyanate, and a hitherto publicly known catalyst can be used.

Although the amount of the catalyst (v) for production is not specifically restricted, it is preferably 0.1 to 10 parts by mass, more preferably 0.2 to 5 parts by mass, based on 100 parts by mass of all the polyol components.

As the catalysts (v) for production, aliphatic amines, such as triethylenediamine, bis(2-dimethylaminoethyl)ether, 1-isobutyl-2-methylimidazole and morpholines, organotin compounds, such as tin octanoate and dibutyltin dilaurate, etc. can be preferably used.

These catalysts can be used singly or in combination of two or more kinds.

<(vi) Blowing Agent>

As the blowing agents, water and physical blowing agents, such as hydroxyfluorocarbons (HFC-245fa, etc.) which were developed for the purpose of global environmental protection, hydrocarbons (cyclopentane, etc.), carbonic acid gas and liquefied carbonic acid gas, can be used. Of these, water, carbonic acid gas and liquefied carbonic acid gas are preferable from the viewpoint of reduction of environmental burden.

As the blowing agent related to the present invention, a physical blowing agent such as liquefied carbonic acid gas is employable, but it is desirable to use water.

When water is used as the blowing agent, the amount of water is preferably 1.3 to 6.5 parts by mass, more preferably 1.8 to 6.0 parts by mass, still more preferably 2.0 to 5.5 parts by mass, particularly preferably 2.0 to 5.0 parts by mass, based on 100 parts by mass of all the polyol components. By the use of water as the blowing agent in the above amount, foaming is stabilized and effectively carried out.

As the blowing agent, a physical blowing agent can be used in combination with water. Of the physical blowing agents, carbon acid gas and liquefied carbonic acid gas are preferable from the viewpoint of reduction of environmental burden.

<Other Assistants>

In the composition for a polyurethane foam, the preparation for a polyurethane foam and the polymer polyol preparation for a polyurethane foam of the present invention, a foam stabilizer, a chain extender, a crosslinking agent, an interconnecting agent, an antifoaming agent, and as other assistants, additives generally used for producing polyurethane foams or polyurethane resins, such as flame retardant, pigment and ultraviolet light absorber, can be used in addition to the above components, within limits not detrimental to the objects of the present invention.

As the foam stabilizer, a hitherto publicly known foam stabilizer can be used, and there is no specific limitation. However, it is preferable to use an organosilicon-based surface active agent.

For example, FV-1-1013-16, SRX-274C, SF-2969, SF-2961, SF-2962, L-3601, SZ-1325 and SZ-1328 available from Dow Corning Toray Silicone Co., Ltd., L-5309, L-5307, L-3600, L-5366 and Y-10366 available from Momentive Performance Materials Inc., DC-2525 and DC-6070 available from Air Products Japan, Inc., B-8715 and B-8742 available from Evonik Industries AG, etc. can be preferably used. The amount of the foam stabilizer used is preferably 0.1 to 10 parts by mass, more preferably 0.5 to 5 parts by mass, based on 100 parts by mass of all the polyol components.

As the additives, there can be mentioned additives described in "Polyurethane" edited by Nobutaka Matsudaira and Tetsuro Maeda, 8th issue, Maki Shoten (1964) pp. 134-137, and "Functional Polyurethane" edited by Hitoshi Matsuo, Nobuaki Kunii and Seishi Tanabe, 1st issue, CMC Publishing Co., Ltd. (1989) pp. 54-68.

In the composition for a polyurethane foam of the present invention, a crosslinking agent can be also used. When a crosslinking agent is used, a compound having a hydroxyl value of 200 to 1800 mgKOH/g is preferably used as the crosslinking agent.

Examples of such crosslinking agents include aliphatic polyhydric alcohols, such as glycerol, and alkanolamines, such as diethanolamine and triethanolamine.

Further, a polyoxyalkylene polyol having a hydroxyl value of 200 to 1800 mgKOH/g can be also used as the crosslinking agent, and furthermore, a hitherto publicly known crosslinking agent can be also used.

When such a crosslinking agent is used, it is preferably used in an amount of not more than 10 parts by mass based on 100 parts by mass of all the polyol components.

<Polyisocyanate and Prepolymer>

The polyisocyanate for use in the present invention is not specifically restricted, and for example, hitherto publicly known polyisocyanates described in "Polyurethane Resin Handbook" edited by Keiji Iwata, 1st issue, The Nikkan Kogyo Shimbun, Ltd. (1987) pp. 71-98, etc. can be mentioned. Of these, toluoylene diisocyanate (isomer ratio of 2,4-form, 2,6-form, etc. is not specifically restricted, but toluoylene diisocyanate having a 2,4-form/2,6-form ratio of 80/20 is preferable) (e.g., COSMONATE (trademark) T-80 available from Mitsui Chemicals, Inc.), polymethylene polyphenyl polyisocyanate (e.g., COSMONATE (trademark) M-200 available from Mitsui Chemicals, Inc.) or its urethane derivative, or a mixture thereof can be preferably used in order to obtain a foamed product.

When the polyisocyanate is a mixture of toluoylene diisocyanate and another polyisocyanate, the amount of the toluoylene diisocyanate contained is desired to be preferably 50 to 99% by mass, more preferably 70 to 90% by mass, particularly preferably 75 to 85% by mass, based on the total amount of the polyisocyanate, from the viewpoint of a balance between durability and mechanical strength of the foam.

As the polyisocyanate for use in the present invention, an isocyanate-terminated prepolymer obtained by allowing a polyol to react with a polyisocyanate through a hitherto publicly known method may be used instead of the aforesaid polyisocyanate.

As the polyisocyanate for use in the present invention, a combination of a polyisocyanate and an isocyanate-terminated prepolymer may be used.

In the present invention, it is desirable to use the components so that the NCO index may preferably become 0.70 to 1.30, more preferably 0.80 to 1.20. When the NCO index is in the above range, a polyurethane foam having appropriate hardness and mechanical strength and having proper impact resilience, elongation and moldability can be obtained. In the present invention, the NCO index means a value obtained by dividing the total number of isocyanate groups in the polyisocyanate by the total number of active hydrogen atoms that react with an isocyanate group, such as a hydroxyl group of a polyol, an amino group of a crosslinking agent and water. That is to say, when the number of active hydrogen atoms that react with an isocyanate group is stoichiometrically equal to the number of isocyanate groups in the polyisocyanate, the NCO index becomes 1.0.

[Production Processes for Preparation for Polyurethane Foam, Polymer Polyol Preparation for Polyurethane Foam and Composition for Polyurethane Foam]

The production process for the composition for a polyurethane foam of the present invention is not specifically restricted as far as the effects of the present invention are exerted, and the composition can be produced by a process publicly known in the polyurethane field.

For example, there is a process wherein given amounts of raw materials are placed in a mixing tank equipped with a stirring device and mixed by the stirring device. In this case, it is preferable to use a mixing tank capable of being closed so that the water content in the composition for a polyurethane foam should not be changed, and it is more preferable to mix them in dry air or nitrogen. In the mixing, the temperature may be ordinary temperature, but in order to improve mixing stirring performance, the temperature may be raised within limits that do not exert evil influence on the production of a polyurethane foam.

In another general process, the composition can be produced by guiding the raw materials introduced in the tank to a piping system by means of a pump or the like and mixing them by a mixing machine installed in the piping system.

The composition for a polyurethane foam of the present invention exhibits high coloration and discoloration inhibition properties over a long period of time when stored and has excellent storage stability, and therefore, even if the compound having a P=N bond and having been used in the production of a polyoxyalkylene polyol, the acid or its salt, etc. are not removed, the composition can be also produced by using a crude polyoxyalkylene polyol. That is to say, in the for said process, the composition can be also produced by adding the antioxidant related to the present invention, the acid or its salt in an amount satisfying the given molar ratio(a/b), and if necessary, other additives to a polyol (i) containing a crude polyoxyalkylene polyol (p) having been obtained by addition polymerization of an alkylene oxide compound onto an active hydrogen compound using a compound having a P=N bond as a catalyst to obtain a preparation (c) for a polyurethane foam, which contains the polyol, the compound having a P=N bond, the antioxidant, the acid or its salt, etc., and then carrying out a step of adding a catalyst for polyurethane foam production, a blowing agent, and if necessary, other assistants directly to the preparation.

In the aforesaid process, the composition can be also produced by adding the antioxidant related to the present invention and the acid or its salt in an amount satisfying the given molar ratio (a/b) to a crude polyoxyalkylene polyol (p) having been obtained by addition polymerization of an alkylene oxide compound onto an active hydrogen compound using a compound having a P=N bond as a catalyst to obtain a preparation (c) for a polyurethane foam, which contains the polyol, the compound having a P=N bond, the antioxidant, the acid or its salt, etc., and then carrying out a step of adding a polyol (i), a catalyst for polyurethane foam production, a blowing agent, and if necessary, other assistants to the preparation.

After the preparation (c) is obtained, a polymer polyol preparation (pc) for a polyurethane foam containing a given amount of a polymer polyol wherein polymer fine particles obtained by polymerizing a compound having an unsaturated bond in the preparation (c) are dispersed, preferably containing a given amount of a polymer polyol wherein polymer fine particles obtained by polymerizing a compound having an unsaturated bond are dispersed in a polyoxyalkylene polyol (p) contained in the preparation (c), is obtained, and this preparation (pc) can be used for the composition for a polyurethane foam. In this case, a polymer polyol may be previously contained in the preparation (c), but when efficiency is taken into consideration, the preparation (c) preferably contains no polymer polyol.

In the aforesaid process, to a polymer polyol wherein polymer fine particles obtained by polymerizing a compound having an unsaturated bond are dispersed, preferably to a polymer polyol wherein polymer fine particles obtained by polymerizing a compound having an unsaturated bond are dispersed in a crude polyoxyalkylene polyol (p) having been obtained by addition polymerization of an alkylene oxide compound onto an active hydrogen compound using a compound having a P=N bond as a catalyst, the antioxidant related to the present invention and the acid or its salt in an amount satisfying the given molar ratio(a/b) are added to obtain a polymer polyol preparation (pc2) for a polyurethane foam, and this preparation (pc2) can be used for the composition for a polyurethane foam.

According to such production processes, steps can be omitted. Therefore, environmental burden can be reduced, and the production cost can be also significantly reduced. Moreover, since the steps are simple, the quality is stabilized and the yield is improved, so that such processes are preferable.

In the production process for a preparation for a polyurethane foam, the acid or its salt (iv) and the antioxidant (iii) are added in given amounts usually at 50 to 130° C. In this case, water or an inert organic solvent may be added in order to improve solubility, dispersibility and handling properties. The water thus added may be used as it is as a blowing agent contained in the resin premix. On the other hand, for the purpose of mainly treating the organic solvent, water may be removed by heat treatment, reduced pressure treatment or reduced pressure heating treatment to such an extent that no influence is exerted on the production of a polyurethane foam. The acid or its salt and the antioxidant may be added at the same time, but it is preferable to add the antioxidant after the acid or its salt is added. Although the antioxidant may be added immediately after the addition of the acid or its salt, it is preferable to add the antioxidant usually after 3 to 120 minutes. Further, it is preferable to add the acid or its salt in such an amount that the ratio (a/b) of the total number of moles (a) of the acid or its salt to the number of moles (b) of the compound having a P=N bond becomes a value of the aforesaid range, because the coloration and discoloration inhibition properties are high over a long time and the storage stability is also high.

Also in the preparation (c) of the present invention, the acid or its salt and the antioxidant may be added at the same time, but it is preferable to add the antioxidant (iii) after the acid or its salt (iv) is added. Addition of the acid or its salt (iv) to the crude polyol (i) containing the polyol (p) may be carried out at room temperature, but taking stirring properties into consideration, the temperature may be raised up to about 120° C. Particularly when the antioxidant is a solid, the temperature is preferably raised to not lower than 60° C. during the addition of the antioxidant, taking solubility into consideration. The addition is preferably carried out at normal pressure or under pressure, and is preferably carried out in a nitrogen atmosphere.

[Polyurethane Foam and Production Process Therefor]

The composition for a polyurethane foam, the preparation for a polyurethane foam and the polymer polyol preparation for a polyurethane foam of the present invention can be used as raw materials of polyurethane foams, particularly those of soft polyurethane foams.

The production process for the polyurethane foam of the present invention is not specifically restricted, and a publicly known production process can be properly adopted. Specifically, any of a slab foaming process, a hot-cure mold foaming process and a cold-cure mold foaming process can be adopted.

For producing the polyurethane foam by a cold-cure mold foaming process, a publicly known cold-cure mold foaming process can be adopted. A resin premix obtained from the composition for a polyurethane foam of the present invention and a polyisocyanate are mixed usually by the use of a high-pressure foaming machine or a low-pressure foaming machine so that the NCO index may become a given value, and this mixture is injected into a mold and subjected to reaction, foaming and curing to obtain a polyurethane foam of a given shape.

The curing time is usually 30 seconds to 30 minutes, the mold temperature is usually room temperature to about 80° C., and the curing temperature is preferably room temperature to about 150° C. After curing, the cured product may be heated at a temperature of 80 to 180° C. within limits not detrimental to the objects and the effects of the present invention.

The resin premix is usually mixed with a polyisocyanate by a high-pressure foaming machine or a low-pressure foaming machine, and in the case where a compound exhibiting hydrolyzability such as an organotin catalyst is used as a catalyst and water is used as a blowing agent, it is preferable that the water component and the organotin catalyst component are injected into the foaming machine through different pathways in order to avoid contact of the catalyst with water, and they are mixed using a mixing head of the foaming machine. From the viewpoints of mixing properties in the foaming machine and moldability of the foam, the viscosity of the resin premix used is preferably not more than 4000 mPa·s (value obtained by using Brookfield type viscometer in JIS K1557-5 (2007)) at 25° C.

Properties (e.g., impact resilience, hardness, durability, etc.) of the polyurethane foam of the present invention can be properly determined according to the use purpose of the polyurethane foam, and for example, automobile interior trim materials such as sheet cushions and sheet backs for vehicles (e.g., automobiles), furniture, beddings, office supplies, etc. can be preferably produced.

EXAMPLES

The present invention is described below in more detail with reference to the following examples, but it should be construed that the present invention is in no way limited to those examples. In the examples, "part (s)" and "%" mean "part (s) by mass" and "% by mass", respectively.

Analysis and measurement in the examples and the comparative examples were carried out in accordance with the following methods.

[Measurement and Evaluation Method]

(1) Hydroxyl Value (OHV)

Measurement was carried out in accordance with the method described in the B method of JIS K-1557-1 (2007).

(2) Total Degree of Unsaturation

Measurement was carried out in accordance with the method described in JIS K-1557-3 (2007).

(3) Content Ratio (% by Mass) of Oxyethylene End Group

The content ratio (% by mass) of an oxyethylene end group in a polyol was calculated from the charge of each component using the following calculation formula.

(Amount of ethylene oxide)/(amount of active hydrogen compound+amount of alkylene oxide+amounts of other components)×100

The content ratio (% by mass) can be measured also by the use of 1H-NMR.

(4) Content Ratio (ppm) of Compound Having P=N Bond

In the examples, the content ratio of the compound having a P=N bond in a polyol was calculated from the charge of each component. The calculation formula is shown below.

(Amount of compound having P=N bond)/(amount of compound having P=N bond+amount of active hydrogen compound+amount of alkylene oxide+amounts of other components)×1000000

Measurement of the content ratio of the compound having a P=N bond in a polyol was carried out by the use of a capillary electrophoresis method using a fully automatic CIA system manufactured by Waters Corporation. To a polyol, a hydrochloric acid aqueous solution was added, and using a shaker, extraction of the compound having a P=N bond from the hydrochloric acid aqueous solution was carried out. Thereafter, standstill liquid separation was carried out to separate an aqueous layer, and using a capillary electrophoresis analyzer, determination of phosphazenium cation was carried out.

On the other hand, when the solubility of the polyol was high, nitrogen atoms remaining in the polyol were determined, whereby the content ratio of phosphazenium cation was calculated back. For the analysis of nitrogen contained in the polyol, a trace total nitrogen analyzer (model: TN-100) manufactured by Mitsubishi Chemical Corporation and an element analyzer (model: PE2400) manufactured by Perkin Elmer, Inc. were used.

The content ratio of the compound having a P=N bond can be determined also by carrying out $^1$H-NMR measurement using a nuclear magnetic resonance apparatus AL-400 manufactured by JOEL Ltd., referring to the method of Japanese Patent Laid-Open Publication No. 2000-344881.

For example, the chemical shift of proton of a methyl group of tetrakis[tris(dimethylamino)phosphoranylideneamino]phosphonium is in the vicinity of 2.7 ppm, and the content ratio can be also calculated by comparing it with tetrakis[tris(dimethylamino)phosphoranylideneamino]phosphonium of a known concentration.

(5) Molar Ratio (a/b) of Acid/Compound Having P=N Bond

With respect to the acid having a sulfuric acid ester group, titration was carried out using sodium hydroxide, and from the titration value obtained, the molar ratio was calculated.

With respect to other acids, the number of moles was calculated from the molecular weight, and the molar ratio was calculated.

(6) Coloring Property Test of Composition (Resin Premix) for Polyurethane Foam.

The composition for a polyurethane foam was portioned in a glass bottle containing nitrogen, and stored for 7 days at room temperature. After the storage, the composition was placed in a colorless and transparent cell having an optical path length of 2 cm, and the appearance (degree of discoloration) was visually observed.

(7) Evaluation of Storage Stability of Composition for Polyurethane Foam

When polyurethane foams were prepared using the composition for a polyurethane foam given immediately after preparation and the composition stored for 7 days at room temperature after preparation, a rise time (RT, second(s)) was measured. A difference ($RT_b$–$RT_a$) between the rise time after 7 days ($RT_b$) and the rise time immediately after preparation ($RT_a$) was calculated, and the resulting value was compared with a value ($RT_b$–$RT_a$: 40 seconds) obtained in Reference Example 1 in which no acid was added, whereby storage stability of the resulting composition for a polyurethane foam was evaluated.

The rise time indicates a time taken for a foamed reaction mixture to reach a maximum height from the beginning of mixing of a resin premix with a polyisocyanate. A smaller difference ($RT_b$–$RT_a$) indicates that the urethanation reaction is more stable without a change with time, so that the reactivity can be properly controlled, and a urethane foam can be stably obtained.

(8) Coloring Property Test of Preparation for Polyurethane Foam

The resulting preparation for a polyurethane foam was portioned in a glass bottle containing nitrogen and stored for 28 days at 50° C. or 24 hours at 100° C. After the preparation or after the storage, the preparation was placed in a colorless and transparent cell having an optical path length of 2 cm, and the appearance (degree of discoloration) was visually observed.

[Raw Materials]
<Polyols>
(Polyol a)

In an autoclave equipped with a stirring device, a thermometer and a manometer, glycerol and tetrakis[tris(dimethylamino)phosphoranylideneamino]phosphonium hydroxide (PZN) in an amount of 0.18 mol %/molOH based on the hydroxyl group of glycerol, as a compound having a P=N bond, were placed, then vacuum dehydration was carried out at 100° C. for 6 hours, and thereafter, propylene oxide was continuously fed at a reaction temperature of 80° C. and a maximum reaction pressure of 3.8 kg/cm$^2$ to perform addition polymerization. Subsequently, ethylene oxide was continuously fed at a reaction temperature of 100° C. and a maximum reaction pressure of 3.8 kg/cm$^2$ to perform addition polymerization, whereby a polyol a was obtained.

The total degree of unsaturation of this polyol was 0.018 meq/g, the hydroxyl value thereof was 34 mgKOH/g, and the content ratio of the oxyethylene end group was 15% by mass. The content ratio of the compound having a P=N bond to the polyol a was calculated to be 800 ppm from the charge of the compound.

(Polyol b)

In an autoclave equipped with a stirring device, a thermometer and a manometer, glycerol and tetrakis[tris(dimethylamino)phosphoranylideneamino]phosphonium hydroxide in an amount of 0.18 mol %/molOH based on the hydroxyl group of glycerol, as a compound having a P=N bond, were placed, then vacuum dehydration was carried out at 100° C. for 6 hours, and thereafter, propylene oxide was continuously fed at a reaction temperature of 80° C. and a maximum reaction pressure of 3.8 kg/cm$^2$ to perform addition polymerization. Subsequently, ethylene oxide was continuously fed at a reaction temperature of 100° C. and a maximum reaction pressure of 3.8 kg/cm$^2$ to perform addition polymerization, whereby a polyol b was obtained.

The total degree of unsaturation of this polyol was 0.025 meq/g, the hydroxyl value thereof was 24 mgKOH/g, and the content ratio of the oxyethylene end group was 14.5% by mass. The content ratio of the compound having a P=N bond to the polyol b was calculated from the charge of the compound, similarly to the polyol (a), and as a result, it was 580 ppm.

(Polyol c)

In an autoclave equipped with a stirring device, a thermometer and a manometer, 1 mol of pentaerythritol, 0.03 mol of glycerol and tetrakis[tris(dimethylamino)phosphoranylideneamino]phosphonium hydroxide in an amount of 0.07 mol %/molOH based on the total amount of the hydroxyl groups of pentaerythritol and glycerol, as a compound having a P=N bond, were placed, and thereafter, propylene oxide was continuously fed at a reaction temperature of 107° C. and a maximum reaction pressure of 2.9 kg/cm² to perform addition polymerization. Subsequently, ethylene oxide was continuously fed at a reaction temperature of 120° C. and a maximum reaction pressure of 2.9 kg/cm² to perform addition polymerization, whereby a polyol c was obtained.

The total degree of unsaturation of this polyol was 0.025 meq/g, the hydroxyl value thereof was 34 mgKOH/g, and the content ratio of the oxyethylene end group was 15% by mass. The content ratio of the compound having a P=N bond to the polyol c was calculated from the charge of the compound, similarly to the polyol (a), and as a result, it was 300 ppm.

(Polyol d)

In an autoclave, the polyol a was placed, then the system was set in a nitrogen atmosphere, and thereafter, the temperature was raised to 80° C. Subsequently, to 100 parts by weight of the polyol a, 4 parts by weight of ion-exchanged water were added, then BHT in an amount of 300 ppm based on the polyol a was introduced, and thereafter, 0.5 part by weight of an adsorbent KW-700 (available from Kyowa Chemical Industry Co., Ltd.) was introduced. After stirring at 100° C. for 3 hours, dehydration was carried out under reduced pressure, and finally, with passing nitrogen into the liquid phase, nitrogen bubbling under reduced pressure was carried out for 4 hours under the conditions of 110° C. and 30 mm Hgabs. (3990 Pa). After the pressure was returned to atmospheric pressure from reduced pressure using nitrogen, vacuum filtration was carried out through a 5C filter paper (retention particle diameter: 1 μm) manufactured by ADVANTEC Toyo Kaisha, Ltd. to perform purification of the polyol.

After the purification operation, the hydroxyl value of the polyol d was 34 mgKOH/g, and the total degree of unsaturation thereof was 0.018 meq./g. The content ratio of the compound having a P=N bond to the polyol d was measured to be 17 ppm by the use of ¹H-NMR.

(Polyol e)

In an autoclave equipped with a stirring device, a thermometer and a manometer, glycerol and tris[tris(dimethylamino)phosphoranylideneamino]phosphine oxide (PZO) in an amount of 0.18 mol %/molOH based on the hydroxyl group of glycerol, as a compound having a P=N bond, were placed, then vacuum dehydration was carried out at 100° C. for 6 hours, and thereafter, propylene oxide was continuously fed at a reaction temperature of 80° C. and a maximum reaction pressure of 3.8 kg/cm² to perform addition polymerization. Subsequently, ethylene oxide was continuously fed at a reaction temperature of 100° C. and a maximum reaction pressure of 3.8 kg/cm² to perform addition polymerization, whereby a polyol e was obtained.

The total degree of unsaturation of this polyol was 0.018 meq/g, the hydroxyl value thereof was 34 mgKOH/g, and the content ratio of the oxyethylene end group was 15% by mass. The content ratio of the compound having a P=N bond to the polyol e was calculated to be 612 ppm from the charge of the compound. The appearance was slightly white opaque.

(Polymer Polyol a)

In an autoclave equipped with a stirring device, a thermometer and a manometer, glycerol and potassium hydroxide were placed, then vacuum dehydration was carried out at 100° C. for 6 hours, and thereafter, propylene oxide was continuously fed at a reaction temperature of 120° C. and a maximum reaction pressure of 3.8 kg/cm² to perform addition polymerization. Subsequently, ethylene oxide was continuously fed at a reaction temperature of 110° C. and a maximum reaction pressure of 3.8 kg/cm² to perform addition polymerization, whereby a polyol f was obtained.

Subsequently, to the polyol f, water and one equivalent of phosphoric acid based on KOH were added, and they were stirred for 30 minutes. Further, an adsorbent (available from Tomita Pharmaceutical Co., Ltd., trade name: AD-600) and 300 ppm of BHT were added, and dehydration drying was carried out for 3 hours under the conditions of 100° C. and 1330 Pa. Thereafter, solids were removed by filtration to obtain a polyol g. The hydroxyl value of this polyol g was 34 mgKOH/g, and the content ratio of the oxyethylene end group was 15% by mass.

In an autoclave equipped with a stirring device, a thermometer, a manometer and a liquid feeding device, the polyol g was introduced to a full liquid level, and the temperature was raised to 120° C. with stirring. To the autoclave, a mixture of the polyol g, 2,2'-azobis(isobutyronitrile), acrylonitrile and styrene was continuously introduced. The initial reaction solution continuously obtained through a discharge port was discarded, and the subsequent reaction solution was used in the next step. The reaction was carried out under the reaction conditions of a reaction temperature of 120° C. and a reaction pressure of 440 kPa, and the residence time was 50 minutes. To the resulting reaction solution, BHT in an amount of 300 ppm based on the reaction solution was added, and thereafter, a reduced pressure heating treatment was carried out for 3 hours under the conditions of 120° C. and not more than 655 Pa to remove an unreacted ethylenically unsaturated monomer and a decomposed product of the polymerization initiator, whereby a polymer polyol a was obtained.

The hydroxyl value of this polymer polyol a was 21 mgKOH/g, the content ratio of a component derived from the polyol g was 61.5% by mass, the content ratio of a polymer component derived from acrylonitrile was 30.8% by mass, and the content ratio of a polymer component derived from styrene was 7.7% by mass. These content ratios were calculated from the charges of the components and the amount of the unreacted monomer determined by gas chromatography. Since the compound having a P=N bond was not used in the preparation of the polymer polyol a, the content ratio of the compound was 0 ppm.

(Polymer Polyol b)

In a four-neck flask equipped with a stirring device, a nitrogen feed pipe and a thermometer, to the polyol b was added DBSA-L in such an amount that the molar ratio (acid (a)/compound (b)) became 4.0, and they were heated at 100° C. for 2 hours. Thereafter, an antioxidant (BHT) was added in an amount of 300 ppm based on the polyol b, and the mixture was heated at 100° C. for 1 hour to obtain a polyol h. The mixing was entirely carried out in a closed state. On the assumption that the compound having a P=N bond was derived from the polyol b and was not eliminated during the preparation, the content ratio of the compound having a P=N bond to the polyol h was taken to be 580 ppm. Further, on the assumption that DBSA-L and BHT were not eliminated either during the preparation, the content ratios of them to the polyol h were calculated to be 1000 ppm and 300 ppm, respectively.

A polymer polyol b was obtained by carrying out the same operations as those of the production of the polymer polyol a, except that the solution of the polyol h was used instead of the polyol g, and acrylonitrile was used while changing the amounts of acrylonitrile and styrene.

The hydroxyl value of this polymer polyol b was 19 mgKOH/g, the content ratio of a component derived from the polyol h was 80% by mass, and the content ratio of a polymer component derived from acrylonitrile was 20% by mass. On the assumption that the compound having a P=N bond was derived from the polyol h and was not eliminated during the step of dispersing the polymer, the content ratio of the compound having a P=N bond to the polymer polyol b was calculated to be 464 ppm.

(Polymer Polyol d)

A polymer polyol c was obtained by carrying out the same operations as those of the production of the polymer polyol a, except that the amounts of acrylonitrile and styrene were changed, and the polyol g was replaced with the polyol c.

The hydroxyl value of this polymer polyol c was 22.3 mgKOH/g, the content ratio of a component derived from the polyol c was 60% by mass, the content ratio of a polymer component derived from acrylonitrile was 12.3% by mass, and the content ratio of a polymer component derived from styrene was 27.7% by mass.

In a four-neck flask equipped with a stirring device, a nitrogen feed pipe and a thermometer, to the polymer polyol c was added DBSA-L in such an amount that the molar ratio (acid (a)/compound (b)) became 4.0, and they were heated at 100° C. for 2 hours. Thereafter, an antioxidant (BHT) was added in an amount of 300 ppm based on the polymer polyol c, and the mixture was heated at 100° C. for 1 hour to obtain a polymer polyol d. The mixing was entirely carried out in a closed state. On the assumption that the compound having a P=N bond was derived from the polyol c and was not eliminated during the preparation, the content ratio of the compound having a P=N bond to the polymer polyol d was taken to be 180 ppm. Further, on the assumption that DBSA-L and BHT were not eliminated either during the preparation, the content ratios of them to the polymer polyol d were calculated to be 310 ppm and 300 ppm, respectively.

(Polymer Polyol e)

In a four-neck flask equipped with a stirring device, a nitrogen feed pipe and a thermometer, to the polyol a was added DBSA-L in such an amount that the molar ratio (acid (a)/compound (b)) became 2.3, and they were heated at 100° C. for 2 hours. Thereafter, an antioxidant (BHT) was added in an amount of 300 ppm based on the polyol a, and the mixture was heated at 100° C. for 1 hour to obtain a polyol i. The mixing was entirely carried out in a closed state. On the assumption that the compound having a P=N bond was derived from the polyol a and was not eliminated during the preparation, the content ratio of the compound having a P=N bond to the polyol i was taken to be 800 ppm. Further, on the assumption that DBSA-L and BHT were not eliminated either during the preparation, the content ratios of them to the polyol were calculated to be 800 ppm and 300 ppm, respectively.

A polymer polyol e was obtained by carrying out the same operations as those of the production of the polymer polyol a, except that the solution of the polyol i was used instead of the polyol g, and acrylonitrile and styrene were used while changing the amounts of acrylonitrile and styrene.

The hydroxyl value of this polymer polyol e was 19.9 mgKOH/g, the content ratio of a component derived from the polyol i was 61% by mass, the content ratio of a polymer component derived from acrylonitrile was 15.6% by mass, and the content ratio of a polymer component derived from styrene was 23.4% by mass. On the assumption that the compound having a P=N bond was derived from the polyol i and was not eliminated during the step of dispersing the polymer, the content ratio of the compound having a P=N bond to the polymer polyol e was calculated to be 488 ppm.

(Polymer Polyol f)

A polyol j was obtained by carrying out the same operations as those of the preparation of the polyol g, except that BHT was not added. Thereafter, a polymer polyol f was obtained by carrying out the same operations as those of the production of the polymer polyol a, except that the polyol j was used and BHT was not used.

The hydroxyl value of this polymer polyol f was 21 mgKOH/g, the content ratio of a component derived from the polyol j was 61.5% by mass, the content ratio of a polymer component derived from acrylonitrile was 30.8% by mass, and the content ratio of a polymer component derived from styrene was 7.7% by mass. These content ratios were calculated from the charges of the components and the amount of the unreacted monomer determined by gas chromatography. Since the compound having a P=N bond was not used in the preparation of the polymer polyol f, the content ratio of the compound was 0 ppm.

<Antioxidants Having Hydroxyphenyl Group>
(Antioxidant a)
BHT (available from Junsei Chemical Co., Ltd.)
(Antioxidant b)
Irganox 1010 (available from BASF Japan Ltd.)
(Antioxidant c)
Irganox 1076 (available from BASF Japan Ltd.)
(Antioxidant d)
Irganox 1135 (available from BASF Japan Ltd.)
<Antioxidant Having No Hydroxyl Group>
(Antioxidant e)
Tris(2-ethylhexyl phosphite) (JP-308E available from Johoku Chemical Co., Ltd.)
(Antioxidant f)
Bis(tridecyl)pentaerythritol diphosphite (JPP-13R available from Johoku Chemical Co., Ltd.)
<Acids and their Salts>
(Acyclic aliphatic monocarboxylic acid of 2 to 25 carbon atoms or its salt>
Acetic acid (available from Wako Pure Chemical Industries, Ltd.)
Heptanoic acid (available from Wako Pure Chemical Industries, Ltd.)
Palmitic acid (available from Wako Pure Chemical Industries, Ltd.)
(Hydroxycarboxylic Acid of 2 to 25 Carbon Atoms or its Salt)
Lactic acid (available from Wako Pure Chemical Industries, Ltd.)
(Polycarboxylic Acid of 20 to 60 Carbon Atoms or its Salt)
Dimer acid (Pripol 1009 available from Croda Japan K.K.)
(Aromatic Monocarboxylic Acid Represented by the Formula (1) or its Salt)
Decylbenzoic acid (DCA available from Wako Pure Chemical Industries, Ltd.)
Benzoic acid (available from Wako Pure Chemical Industries, Ltd.)
(Sulfonic Acid or its Salt)
p-Toluenesulfonic acid (PTSA available from Wako Pure Chemical Industries, Ltd.)
Camphorsulfonic acid (CSA available from Wako Pure Chemical Industries, Ltd.)

Dodecylbenzenesulfonic acid (DBSA-L (straight-chain type): NEOPELEX GS available from Kao Corporation)

Dodecylbenzenesulfonic acid (DBSA-B (branched type): Lipon LH-900 available from Lion Corporation)

(Acid Having Sulfuric Acid Ester Group or its Salt)

Polyoxyethylene styrenated phenyl ether ammonium sulfate (Latemul E-1000A available from Kao Corporation)

Polyoxyalkylene alkenyl ether ammonium sulfate (Latemul PD-105 available from Kao Corporation)

(Others)

Oxalic acid (available from Wako Pure Chemical Industries, Ltd.)

Suberic acid (available from Wako Pure Chemical Industries, Ltd.)

Phosphoric acid (available from Wako Pure Chemical Industries, Ltd.)

<Catalysts for Polyurethane Foam>

(Catalyst a)

Amine catalyst of Minico L-1020 (trade name, 33% diethylene glycol solution of triethylenediamine) available from Katsuzai-Chemical Corporation (Catalyst b)

Amine catalyst of bis(2-dimethylaminoethyl)ether (trade name: Minico TMDA) available from Katsuzai-Chemical Corporation <Blowing Agent>

Water

<Other Additives>

(Interconnecting Agent a)

Polyether polyol of ACTOCOL EP-505S (trade name, hydroxyl value: 52 mgKOH/g) available from Mitsui Chemicals, Inc.

(Crosslinking Agent a)

Amine-based crosslinking agent of ACTOCOL KL-210 (trade name, hydroxyl value: 840 mgKOH/g) available from Mitsui Chemicals, Inc.

(Crosslinking Agent b)

Purified glycerol (hydroxyl value: 1830 mgKOH/g)

(Foam Stabilizer a)

Silicone foam stabilizer of DC-6070 (trade name) available from Air Products Japan, Inc.

(Foam Stabilizer b)

Silicone foam stabilizer of DC-2525 (trade name) available from Air Products Japan, Inc.

Preparation of Composition for Polyurethane Foam and Polyurethane Foam

Example 1

In a four-neck flask equipped with a stirring device, a nitrogen feed pipe and a thermometer, to the polyol a was added acetic acid in such an amount that the molar ratio (a/b) became 20.5, and they were heated at 100° C. for 2 hours. Thereafter, an antioxidant (BHT) was added in an amount of 300 ppm based on the polyol a, and the mixture was heated at 100° C. for 1 hour to prepare a preparation for a polyurethane foam. The mixing was entirely carried out in a closed state. On the assumption that the compound having a P=N bond was derived from the polyol a and was not eliminated during the preparation, the content ratio of the compound having a P=N bond to the polyol a was taken to be 800 ppm. Further, on the assumption that acetic acid and BHT were not eliminated either during the preparation, the content ratios of them to the polyol a were calculated to be 1300 ppm and 300 ppm, respectively.

60 Parts of the preparation for a polyurethane foam, 40 parts of the polymer polyol (a), 0.4 part of the catalyst (a), 0.1 part of the catalyst (b), 4.0 parts of water, 1.5 parts of the interconnecting agent (a), 2.5 parts of the crosslinking agent (a), 0.2 part of the crosslinking agent (b), 0.3 part of the foam stabilizer (a) and 0.7 part of the foam stabilizer (b) were mixed to prepare a composition (resin premix) for a polyurethane foam. As the compound having a P=N bond (catalyst), the compound contained in the preparation for a polyurethane foam was used as it was, and therefore, the content ratio of the compound having a P=N bond in the resin premix was calculated to be 438 ppm. The content ratios of acetic acid and BHT in the resin premix were calculated to be 711 ppm and 273 ppm, respectively. Using the resulting resin premix, a coloring property evaluation test was carried out. The results are set forth in Table 1. The resin premix was not discolored even after storage for 7 days.

Subsequently, 100 parts by mass of the resin premix were temperature-controlled to 22±1° C. in advance, then to the resin premix, 46 parts of a polyisocyanate (COSMONATE (trademark) TM-20 available from Mitsui Chemicals, Inc.) (NCO index: 1.00) having been temperature-controlled to 22±1° C. were added, and they were immediately vigorously stirred at 5000 rpm for 5 seconds using a homogenizer. Thereafter, the mixed liquid was introduced into a polypropylene container of 150 mm (diameter)×300 mm (height) to obtain apolyurethane foam. During foaming, a rise time ($RT_a$) was measured in an environment of 22±1° C. by the use of a laser sensor manufactured by Keyence Corporation, and the foam height was also recorded for 5 minutes.

Using the composition after storage for 7 days at room temperature, a rise time ($RT_b$) was measured in the same manner as that for the composition immediately after preparation, and storage stability of the resin premix was evaluated. The results are set forth in Table 1.

Each of the urethane foams obtained by the use of the composition immediately after preparation and the composition after storage for 7 days was not yellowed and had proper impact resilience, moldability and durability.

Examples 2 to 24 and 27, Comparative Examples 1 to 5

Resin premixes and polyurethane foams (Examples 2 to 24 and 27, Comparative Examples 1 to 5) were obtained in the same manner as in Example 1, except that the charges of the polyols (a to e), the polymer polyols (a, b, e and f), the antioxidants (a to f), the acid or its salt, the catalysts (a and b), water, the interconnecting agent (a), the crosslinking agents (a and b) and the foam stabilizers (a and b) were changed in accordance with Tables 1 to 4. The results are set forth in Tables 1 to 4.

Example 25

40 Parts of the polymer polyol (b) as the preparation (c) for a polyurethane foam, 60 parts of the polyol (d), 0.4 part of the catalyst (a), 0.1 part of the catalyst (b), 3.9 parts of water, 1.0 part of the interconnecting agent (a), 1.5 parts of the crosslinking agent (a), 0.2 part of the crosslinking agent (b) and 1.0 part of the foam stabilizer (b) were mixed to prepare a composition (resin premix) for a polyurethane foam. The compound having a P=N bond (catalyst) was contained in the polyol (d) and the polymer polyol (b), and therefore, the content ratio of the compound having P═N bond in the resin premix was calculated to be 222 ppm. The content ratios of DBSA-L and BHT in the resin premix were calculated to be 370 ppm and 278 ppm, respectively. Using the resulting resin premix, a coloring property evaluation test was carried out.

Further, the same operations as in Example 1 were carried out to obtain a polyurethane foam, and storage stability of the resin premix was evaluated. The results are set forth in Table 3.

The urethane foams obtained by the use of the composition immediately after preparation and the composition after storage for 7 days were evaluated, and as a result, each of them was not yellowed and had proper impact resilience, moldability and durability.

Example 26

A resin premix and a polyurethane foam were obtained by carrying out the same operations as in Example 25, except that the amount of the polyol (d) mixed was changed and the polymer polyol (b) was replaced with the polymer polyol (e). The results are set forth in Table 3.

The urethane foams obtained by the use of the composition immediately after preparation and the composition after storage for 7 days were evaluated, and as a result, each of them was not yellowed and had proper impact resilience, moldability and durability.

Reference Example 1

In a four-neck flask equipped with a stirring device, a nitrogen feed pipe and a thermometer, to the polyol a was added an antioxidant (BHT) in an amount of 300 ppm based on the polyol a, and they were heated at 100° C. for 1 hour. The mixing was entirely carried out in a closed state. On the assumption that the compound having a P═N bond was derived from the polyol a and was not eliminated during the preparation, the content ratio of the compound having a P═N bond to the polyol a was taken to be 800 ppm. Further, on the assumption that BHT was not eliminated either during the preparation, the content ratio of BHT to the polyol a was calculated to be 300 ppm.

Using 60 parts of the preparation for a polyurethane foam, 40 parts of the polymer polyol (a), 0.4 part of the catalyst (a), 0.1 part of the catalyst (b), 3.9 parts of water, 1.0 part of the interconnecting agent (a), 1.5 parts of the crosslinking agent (a), 0.2 part of the crosslinking agent (b) and 1.0 part of the foam stabilizer (b), the same operations as in Example 1 were carried out, whereby a resin premix and a polyurethane foam were obtained, and they were evaluated.

The results are set forth in Table 4.

Reference Examples 2 and 3

Resin premixes and polyurethane foams (Reference Examples 2 and 3) were obtained in the same manner as in Reference Example 1, except that the polyol (a or d), water, the interconnecting agent (a), the crosslinking agent (a) and the foam stabilizers (a and b) were changed in accordance with Table 4. Then, they were evaluated.

The results are set forth in Table 4.

TABLE 1

| | Example | | | | | | | | | |
|---|---|---|---|---|---|---|---|---|---|---|
| Resin premix | 1 | 2 | 3 | 4 | 5 | 6 | 7 | 8 | 9 | 10 |
| Content in resin premix (part(s) by mass) | | | | | | | | | | |
| Polyol a | 60 | 60 | 60 | 45 | 60 | 60 | 60 | 60 | 60 | |
| Polyol b | | | | | | | | | | 60 |
| Polyol d | | | | 15 | | | | | | |
| Polymer polyol a | 40 | 40 | 40 | 40 | 40 | 40 | 40 | 40 | 40 | 40 |
| Content ratio ($\times 10^6$) of compound having P═N bond to polyol in preparation (c) | 800 | 800 | 800 | 604 | 800 | 800 | 800 | 800 | 800 | 580 |
| Content ratio ($\times 10^6$) of compound having P═N bond to resin premix | 438 | 438 | 438 | 330 | 438 | 438 | 438 | 438 | 438 | 322 |
| Content ratio ($\times 10^6$) of antioxidant a to polyol in preparation (c) | 300 | 300 | 300 | 300 | 300 | 300 | 300 | 300 | 300 | 300 |
| Content ratio ($\times 10^6$) of antioxidant a to resin premix | 273 | 273 | 273 | 273 | 273 | 273 | 273 | 273 | 273 | 278 |
| Acid species | acetic acid | heptanoic acid | palmitic acid | dimer acid | DCA | PTSA | CSA | lactic acid | benzoic acid | DBSA-L |
| Content ratio ($\times 10^6$) of acid to polyol in preparation (c) | 1300 | 2000 | 3000 | 1200 | 1100 | 250 | 370 | 300 | 700 | 1000 |
| Content ratio ($\times 10^6$) of acid to resin premix | 711 | 1094 | 1641 | 656 | 602 | 137 | 202 | 164 | 383 | 555 |
| Catalyst a | 0.4 | 0.4 | 0.4 | 0.4 | 0.4 | 0.4 | 0.4 | 0.4 | 0.4 | 0.4 |
| Catalyst b | 0.1 | 0.1 | 0.1 | 0.1 | 0.1 | 0.1 | 0.1 | 0.1 | 0.1 | 0.1 |
| Water | 4.0 | 4.0 | 4.0 | 4.0 | 4.0 | 4.0 | 4.0 | 4.0 | 4.0 | 3.9 |
| Interconnecting agent a | 1.5 | 1.5 | 1.5 | 1.5 | 1.5 | 1.5 | 1.5 | 1.5 | 1.5 | 1.0 |
| Crosslinking agent a | 2.5 | 2.5 | 2.5 | 2.5 | 2.5 | 2.5 | 2.5 | 2.5 | 2.5 | 1.5 |
| Crosslinking agent b | 0.2 | 0.2 | 0.2 | 0.2 | 0.2 | 0.2 | 0.2 | 0.2 | 0.2 | 0.2 |
| Foam stabilizer a | 0.3 | 0.3 | 0.3 | 0.3 | 0.3 | 0.3 | 0.3 | 0.3 | 0.3 | |
| Foam stabilizer b | 0.7 | 0.7 | 0.7 | 0.7 | 0.7 | 0.7 | 0.7 | 0.7 | 0.7 | 1.0 |
| Acid/compound having P═N bond (mol/mol) | 20.5 | 14.5 | 11.1 | 2.7 | 4.0 | 1.2 | 1.5 | 3.2 | 5.4 | 4.0 |
| Polyisocyanate | TM-20 | TM-20 | TM-20 | TM-20 | TM-20 | TM-20 | TM-20 | TM-20 | TM-20 | TM-20 |
| Coloring property test | | | | | | | | | | |
| Immediately after preparation | cream color | cream color | cream color | cream color | cream color | cream color | cream color | cream color | cream color | cream color |
| 7 days after preparation | cream color | cream color | cream color | cream color | cream color | cream color | cream color | cream color | cream color | cream color |

TABLE 1-continued

|  | Example | | | | | | | | | |
|---|---|---|---|---|---|---|---|---|---|---|
| Resin premix | 1 | 2 | 3 | 4 | 5 | 6 | 7 | 8 | 9 | 10 |
| Evaluation of storage stability | | | | | | | | | | |
| Immediately after preparation $RT_a$ (sec) | 133 | 119 | 119 | 104 | 108 | 107 | 113 | 113 | 106 | 113 |
| 7 days after preparation $RT_b$ (sec) | 136 | 123 | 117 | 115 | 115 | 116 | 120 | 125 | 127 | 117 |
| $RT_b - RT_a$ | 3 | 4 | −2 | 11 | 7 | 9 | 7 | 12 | 21 | 4 |

(1) Each content ratio was calculated from the charge.

TABLE 2

|  | Example | | | | | | | | | | |
|---|---|---|---|---|---|---|---|---|---|---|---|
| Resin premix | 11 | 12 | 13 | 14 | 15 | 16 | 17 | 18 | 19 | 20 | 21 |
| Content in resin premix (part(s) by mass) | | | | | | | | | | | |
| Polyol a |  | 60 | 60 | 60 | 60 | 60 |  | 60 | 60 | 60 |  |
| Polyol b | 60 |  |  |  |  |  | 60 |  |  |  | 60 |
| Polymer polyol a | 40 | 40 | 40 | 40 | 40 | 40 | 40 | 40 | 40 | 40 | 40 |
| Content ratio (×10$^6$) of compound having P=N bond to polyol in preparation (c) | 580 | 800 | 800 | 800 | 800 | 800 | 580 | 800 | 800 | 800 | 580 |
| Content ratio (×10$^6$) of compound having P=N bond to resin premix | 322 | 438 | 438 | 438 | 438 | 438 | 322 | 438 | 438 | 438 | 322 |
| Content ratio (×10$^6$) of antioxidant a to polyol in preparation (c) | 300 | 300 |  |  |  | 10,000 | 300 | 300 | 300 | 300 | 300 |
| Content ratio (×10$^6$) of antioxidant a to resin premix | 278 | 273 | 109 | 109 | 109 | 5,579 | 278 | 273 | 273 | 273 | 278 |
| Content ratio (×10$^6$) of antioxidant b to polyol in preparation (c) |  |  | 300 |  |  |  |  |  |  |  |  |
| Content ratio (×10$^6$) of antioxidant b to resin premix |  |  | 164 |  |  |  |  |  |  |  |  |
| Content ratio (×10$^6$) of antioxidant c to polyol in preparation (c) |  |  |  | 300 |  |  |  |  |  |  |  |
| Content ratio (×10$^6$) of antioxidant c to resin premix |  |  |  | 164 |  |  |  |  |  |  |  |
| Content ratio (×10$^6$) of antioxidant d to polyol in preparation (c) |  |  |  |  | 300 |  |  |  |  |  |  |
| Content ratio (×10$^6$) of antioxidant d to resin premix |  |  |  |  | 164 |  |  |  |  |  |  |
| Acid species | DBSA-B | DBSA-L | DBSA-L | DBSA-L | DBSA-L | DBSA-L | Latemul E-1000A | Latemul PD-105 | DBSA-L | DBSA-L | DBSA-L |
| Content ratio (×10$^6$) of acid to polyol in preparation (c) | 500 | 100 | 1030 | 1030 | 1030 | 1030 | 3000 | 2000 | 10300 | 70 | 1375 |
| Content ratio (×10$^6$) of acid to resin premix | 278 | 55 | 563 | 563 | 563 | 563 | 1665 | 1094 | 5634 | 38 | 763 |
| Catalyst a | 0.4 | 0.4 | 0.4 | 0.4 | 0.4 | 0.4 | 0.4 | 0.4 | 0.4 | 0.4 | 0.4 |
| Catalyst b | 0.1 | 0.1 | 0.1 | 0.1 | 0.1 | 0.1 | 0.1 | 0.1 | 0.1 | 0.1 | 0.1 |
| Water | 3.9 | 4.0 | 4.0 | 4.0 | 4.0 | 4.0 | 3.9 | 4.0 | 4.0 | 4.0 | 3.9 |
| Interconnecting agent a | 1.0 | 1.5 | 1.5 | 1.5 | 1.5 | 1.5 | 1.0 | 1.5 | 1.5 | 1.5 | 1.0 |
| Crosslinking agent a | 1.5 | 2.5 | 2.5 | 2.5 | 2.5 | 2.5 | 1.5 | 2.5 | 2.5 | 2.5 | 1.5 |
| Crosslinking agent b | 0.2 | 0.2 | 0.2 | 0.2 | 0.2 | 0.2 | 0.2 | 0.2 | 0.2 | 0.2 | 0.2 |
| Foam stabilizer a |  | 0.3 | 0.3 | 0.3 | 0.3 | 0.3 |  | 0.3 | 0.3 | 0.3 |  |
| Foam stabilizer b | 1.0 | 0.7 | 0.7 | 0.7 | 0.7 | 0.7 | 1.0 | 0.7 | 0.7 | 0.7 | 1.0 |
| Acid/compound having P=N bond (mol/mol) | 2.0 | 0.3 | 3.0 | 3.0 | 3.0 | 3.0 | 1.3 | 1.5 | 29.8 | 0.2 | 5.5 |
| Polyisocyanate | TM-20 | TM-20 | TM-20 | TM-20 | TM-20 | TM-20 | TM-20 | TM-20 | TM-20 | TM-20 | TM-20 |
| Coloring property test | | | | | | | | | | | |
| Immediately after preparation | cream color | cream color | cream color | cream color | cream color | cream color | cream color | cream color | cream color | cream color | cream color |
| 7 days after preparation | cream color | cream color | cream color | cream color | cream color | cream color | cream color | cream color | cream color | orange color | cream color |
| Evaluation of storage stability | | | | | | | | | | | |
| Immediately after preparation $RT_a$ (sec) | 102 | 96 | 102 | 112 | 114 | 110 | 110 | 104 | No foam obtained | 96 | 135 |

TABLE 2-continued

| Resin premix | Example | | | | | | | | | | |
|---|---|---|---|---|---|---|---|---|---|---|---|
| | 11 | 12 | 13 | 14 | 15 | 16 | 17 | 18 | 19 | 20 | 21 |
| 7 days after preparation RT$_b$ (sec) | 108 | 107 | 108 | 118 | 123 | 119 | 114 | 110 | | 107 | 141 |
| RT$_b$ − RT$_a$ | 6 | 11 | 6 | 6 | 9 | 9 | 4 | 6 | | 11 | 6 |

(1) Each content ratio was calculated from the charge.

TABLE 3

| Resin premix | Example | | | | | |
|---|---|---|---|---|---|---|
| | 22 | 23 | 24 | 25 | 26 | 27 |
| Content in resin premix (part(s) by mass) | | | | | | |
| Polyol a | 60 | 60 | 60 | | 60 | |
| Polyol d | | | | 50 | | |
| Polyol e | | | | | | 60 |
| Polymer polyol a | 40 | 40 | 40 | | | 40 |
| Polymer polyol b | | | | 50 | | |
| Polymer polyol e | | | | | 40 | |
| Content ratio (×10$^6$) of compound having P=N bond to polyol in preparation (c) | 800 | 800 | 800 | 17 | 17 | 612 |
| Content ratio (×10$^6$) of compound having P=N bond to polymer polyol in preparation (c) | | | | 464 | 488 | |
| Content ratio (×10$^6$) of compound having P=N bond to resin premix | 444 | 444 | 444 | 222 | 190 | 340 |
| Content ratio (×10$^6$) of antioxidant a to polyol in preparation (c) | 300 | 300 | 300 | 300 | 300 | 300 |
| Content ratio (×10$^6$) of antioxidant a to resin premix | 249 | 249 | 249 | 278 | 278 | 278 |
| Acid species | DBSA-L | DBSA-L | DBSA-L | DBSA-L | DBSA-L | DBSA-L |
| Content ratio (×10$^6$) of acid to polyol in preparation (c) | 3106 | 4142 | 5176 | | | 400 |
| Content ratio (×10$^6$) of acid to polymer polyol in preparation (c) | | | | 800 | 488 | |
| Content ratio (×10$^6$) of acid to resin premix | 1724 | 2299 | 2873 | 370 | 181 | 148 |
| Catalyst a | 0.4 | 0.4 | 0.4 | 0.4 | 0.4 | 0.4 |
| Catalyst b | 0.1 | 0.1 | 0.1 | 0.1 | 0.1 | 0.1 |
| Water | 3.9 | 3.9 | 3.9 | 3.9 | 3.9 | 3.9 |
| Interconnecting agent a | 1.0 | 1.0 | 1.0 | 1.0 | 1.0 | 1.0 |
| Crosslinking agent a | 1.5 | 1.5 | 1.5 | 1.5 | 1.5 | 1.5 |
| Crosslinking agent b | 0.2 | 0.2 | 0.2 | 0.2 | 0.2 | 0.2 |
| Foam stabilizer a | | | | | | |
| Foam stabilizer b | 1.0 | 1.0 | 1.0 | 1.0 | 1.0 | 1.0 |
| Acid/compound having P=N bond (mol/mol) | 9.0 | 12.0 | 15.0 | 4.0 | 2.3 | 1.2 |
| Polyisocyanate | TM-20 | TM-20 | TM-20 | TM-20 | TM-20 | TM-20 |
| Coloring property test | | | | | | |
| Immediately after preparation | cream color | cream color | cream color | cream color | white color | cream color |
| 7 days after preparation | cream color | cream color | cream color | cream color | white color | cream color |
| Evaluation of storage stability | | | | | | |
| Immediately after preparation RT$_a$ (sec) | 156 | 184 | 237 | 127 | 117 | 113 |
| 7 days after preparation RT$_b$ (sec) | 156 | 188 | 241 | 123 | 118 | 119 |
| RT$_b$ − RT$_a$ | 0 | 4 | 4 | −4 | 1 | 6 |

(1) Each content ratio was calculated from the charge.

TABLE 4

| Resin premix | Comparative Example | | | | | Reference Example | | |
|---|---|---|---|---|---|---|---|---|
| | 1 | 2 | 3 | 4 | 5 | 1 | 2 | 3 |
| Content in resin premix (part(s) by mass) | | | | | | | | |
| Polyol a | 37.5 | 22.5 | | 60 | 60 | 60 | 60 | |
| Polyol c | | | 60 | | | | | |
| Polyol d | 22.5 | 37.5 | | | | | | 60 |
| Polymer polyol a | 40 | 40 | 40 | | | 40 | 40 | 40 |
| Polymer polyol f | | | | 40 | 40 | | | |

TABLE 4-continued

|  | Comparative Example | | | | | Reference Example | | |
|---|---|---|---|---|---|---|---|---|
| Resin premix | 1 | 2 | 3 | 4 | 5 | 1 | 2 | 3 |
| Content ratio (×10$^6$) of compound having P═N bond to polyol in preparation (c) | 506 | 311 | 300 | 800 | 800 | 800 | 800 | 17 |
| Content ratio (×10$^6$) of compound having P═N bond to resin premix | 277 | 170 | 164 | 438 | 438 | 444 | 438 | 9 |
| Content ratio (×10$^6$) of antioxidant a to polyol in preparation (c) | 300 | 300 | 300 | | | 300 | 0 | 300 |
| Content ratio (×10$^6$) of antioxidant a to resin premix | 273 | 273 | 273 | | | 278 | 109 | 273 |
| Content ratio (×10$^6$) of antioxidant e to polyol in preparation (c) | | | | 10,000 | | | | |
| Content ratio (×10$^6$) of antioxidant e to resin premix | | | | 5,469 | | | | |
| Content ratio (×10$^6$) of antioxidant f to polyol in preparation (c) | | | | | 10,000 | | | |
| Content ratio (×10$^6$) of antioxidant f to resin premix | | | | | 5,469 | | | |
| Acid species | oxalic acid | suberic acid | phosphoric acid | DBSA-L | DBSA-L | | | |
| Content ratio (×10$^6$) of acid to polyol in preparation (c) | 120 | 210 | 100 | 1030 | 1030 | 0 | 0 | 0 |
| Content ratio (×10$^6$) of acid to resin premix | 66 | 115 | 55 | 563 | 563 | 0 | 0 | 0 |
| Catalyst a | 0.4 | 0.4 | 0.4 | 0.4 | 0.4 | 0.4 | 0.4 | 0.4 |
| Catalyst b | 0.1 | 0.1 | 0.1 | 0.1 | 0.1 | 0.1 | 0.1 | 0.1 |
| Water | 4.0 | 4.0 | 4.0 | 4.0 | 4.0 | 3.9 | 4.0 | 4.0 |
| Interconnecting agent a | 1.5 | 1.5 | 1.5 | 1.5 | 1.5 | 1.0 | 1.5 | 1.5 |
| Crosslinking agent a | 2.5 | 2.5 | 2.5 | 2.5 | 2.5 | 1.5 | 2.5 | 2.5 |
| Crosslinking agent b | 0.2 | 0.2 | 0.2 | 0.2 | 0.2 | 0.2 | 0.2 | 0.2 |
| Foam stabilizer a | 0.3 | 0.3 | 0.3 | 0.3 | 0.3 | | 0.3 | 0.3 |
| Foam stabilizer b | 0.7 | 0.7 | 0.7 | 0.7 | 0.7 | 1.0 | 0.7 | 0.7 |
| Acid/compound having P═N bond (mol/mol) | 2.0 | 2.9 | 2.6 | 3.0 | 3.0 | — | — | — |
| Polyisocyanate | TM-20 | TM-20 | TM-20 | TM-20 | TM-20 | TM-20 | TM-20 | TM-20 |
| Coloring property test | | | | | | | | |
| Immediately after preparation | cream color | cream color | cream color | cream color | cream color | pink color | cream color | cream color |
| 7 days after preparation | cream color | cream color | cream color | cream color | cream color | pink color | orange color | cream color |
| Evaluation of storage stability | | | | | | | | |
| Immediately after preparation RT$_a$ (sec) | 104 | 105 | 109 | 107 | 119 | 100 | 91 | 105 |
| 7 days after preparation RT$_b$ (sec) | 174 | 199 | 184 | 147 | 165 | 140 | 125 | 113 |
| RT$_b$ - RT$_a$ | 70 | 94 | 75 | 40 | 46 | 40 | 34 | 8 |

(1) Each content ratio was calculated from the charge.

(Observation of Change of Polyurethane Foam with Time)

Appearances of the polyurethane foams obtained in Examples 10, 11, 17, and 22 to 27 were visually observed. The appearance 5 minutes after foaming and the appearance 10 minutes after foaming were compared, and a polyurethane foam whose appearance shrinkage had been observed was evaluated as "X". Likewise, a polyurethane foam whose appearance shrinkage had been observed one hour after foaming was evaluated as "Δ", and a polyurethane foam whose appearance shrinkage had not been observed even one hour after foaming was evaluated as "○".

The results are set forth in Table 5.

TABLE 5

|  | Example | | | | | | | | |
|---|---|---|---|---|---|---|---|---|---|
|  | 10 | 11 | 17 | 22 | 23 | 24 | 25 | 26 | 27 |
| Acid species | DBSA-L | DBSA-B | Latemul E-1000A | DBSA-L | DBSA-L | DBSA-L | DBSA-L | DBSA-L | DBSA-L |
| Compound having P═N bond | PZN | PZN | PZN | PZN | PZN | PZN | PZN | PZN | PZO |
| Acid/compound having P═N bond (mol/mol) | 4.0 | 2.0 | 1.3 | 9.0 | 12.0 | 15.0 | 4.0 | 2.3 | 1.2 |
| Appearance | ○ | ○ | ○ | ○ | Δ | X | ○ | ○ | ○ |

(Properties of Soft Polyurethane Foam)

The resin premixes obtained in Examples 10 and 11 were temperature-controlled to 22±1° C. in advance, then to each of the resin premixes, a polyisocyanate (COSMONATE (trademark) TM-20 available from Mitsui Chemicals, Inc.) (NCO index: 1.00) having been temperature-controlled to 22±1C was added, and they were immediately vigorously stirred at 5000 rpm for 5 seconds by the use of a homogenizer. The mixtures were each injected into an aluminum test mold (internal size: 300×300×100 mm) of 65° C. having been coated with a commercially available release agent in advance, and thereafter, the mold was covered with a lid and closed with a clamp to perform foaming/curing. Five minutes after the beginning of stirring, the clamp of the test mold was removed, then the cured soft polyurethane foam was released from the mold, and subsequently, the thickness of the polyurethane foam was compressed by 80% using a roller to completely interconnect bubbles (crushing operation). Various properties of the soft polyurethane foam obtained 24 hours after foaming were measured by the methods described in JIS K-6400. The results are set forth in Table 6.

TABLE 6

|  | Example 10 | | Example 11 | |
| --- | --- | --- | --- | --- |
|  | Immediately after preparation | 7 days after preparation | Immediately after preparation | 7 days after preparation |
| Hardness 25% ILD (kgf/314 cm$^2$) | 188 | 185 | 175 | 177 |
| Overall density (kg/m$^3$) | 42.7 | 41.4 | 42.3 | 40.9 |
| Wet heat durability Wet set (%) | 11.6 | 11.5 | 12.7 | 11.5 |

Example 100

In a four-neck flask equipped with a stirring device, a nitrogen feed pipe and a thermometer, to 100 parts by weight of the polyol a was added PTSA in such an amount that the molar ratio (a/b) became 1.2, and they were heated at 100° C. for 2 hours. Thereafter, an antioxidant (BHT) was added in an amount of 300 ppm based on the polyol a, and the mixture was heated at 100° C. for 1 hour to obtain a preparation for a polyurethane foam. The mixing was entirely carried out in a closed state. On the assumption that the compound having a P=N bond was derived from the polyol a and was not eliminated during the preparation, the content ratio of the compound having a P—N bond to the polyol a was taken to be 800 ppm. Further, on the assumption that PTSA and BHT were not eliminated either during the preparation, the content ratios of them to the polyol a were calculated to be 250 ppm and 300 ppm, respectively.

The resulting preparation was subjected to a coloring property test. The results are set forth in Table 7. The preparation for a polyurethane foam was not discolored after the passage of 24 hours at 100° C. and even after storage for 28 days at 50° C.

Examples 101 to 106, Comparative Examples 100 and 101, Reference Examples 100 and 101

Preparations for polyurethane foam (Examples 101 to 106, Comparative Examples 100 and 101, Reference Examples 100 and 101) were obtained in the same manner as in Example 100, except that the charges of the polyols (a, c, d), the antioxidants (a to c) and the acid or its salt were changed in accordance with Table 7 or 8.

Evaluation results of the preparations obtained are set forth in Tables 7 and 8.

Examples 107 and 108

Using the polymer polyol b or d as the preparation (c) for a polyurethane foam, evaluation was carried out. The results are set forth in Table 7.

TABLE 7

| | Example | | | | | | | | |
| --- | --- | --- | --- | --- | --- | --- | --- | --- | --- |
| Polyol | 100 | 101 | 102 | 103 | 104 | 105 | 106 | 107 | 108 |
| Blending quantity (part(s) by mass) | | | | | | | | | |
| Polyol a | 100 | 100 | 100 | 100 | 100 | 100 | 100 | | |
| Polymer polyol b | | | | | | | | 100 | |
| Polymer polyol d | | | | | | | | | 100 |
| Content ratio (×10$^6$) of compound having P=N bond to polyol in preparation (c) | 800 | 800 | 800 | 800 | 800 | 800 | 800 | | |
| Content ratio (×10$^6$) of compound having P=N bond to polymer polyol in preparation (c) | | | | | | | | 464 | 180 |
| Content ratio (×10$^6$) of antioxidant a to polyol in preparation (c) | 300 | 300 | 300 | 300 | 300 | | | | |
| Content ratio (×10$^6$) of antioxidant a to polymer polyol in preparation (c) | | | | | | | | 300 | 300 |
| Content ratio (×10$^6$) of antioxidant b to polymer polyol in preparation (c) | | | | | | 300 | | | |
| Content ratio (×10$^6$) of antioxidant c to polymer polyol in preparation (c) | | | | | | | 300 | | |

TABLE 7-continued

| Polyol | Example | | | | | | | | |
|---|---|---|---|---|---|---|---|---|---|
| | 100 | 101 | 102 | 103 | 104 | 105 | 106 | 107 | 108 |
| Acid species | PTSA | CSA | lactic acid | benzoic acid | DBSA-L | DBSA-L | DBSA-L | DBSA-L | DBSA-L |
| Content ratio (×$10^6$) of acid to polyol in preparation (c) | 250 | 370 | 300 | 700 | 100 | 1030 | 1030 | | |
| Content ratio (×$10^6$) of acid to polymer polyol in preparation (c) | | | | | | | | 800 | 310 |
| Acid/compound having P=N bond (mol/mol) | 1.2 | 1.5 | 3.2 | 5.4 | 0.3 | 3.0 | 3.0 | 4.0 | 4.0 |
| Coloring property test | | | | | | | | | |
| First day of preparation | colorless and transparent | colorless and transparent | colorless and transparent | colorless and transparent | colorless and transparent | colorless and transparent | colorless and transparent | cream color | cream color |
| 24 hours after preparation (storage at 100° C.) | colorless and transparent | colorless and transparent | colorless and transparent | colorless and transparent | colorless and transparent | colorless and transparent | colorless and transparent | cream color | cream color |
| 28 days after preparation (storage at 50° C.) | colorless and transparent | colorless and transparent | colorless and transparent | colorless and transparent | colorless and transparent | colorless and transparent | colorless and transparent | cream color | cream color |

(1) Each content ratio was calculated from the charge.

TABLE 8

| | Comparative Example | | Reference Example | |
|---|---|---|---|---|
| Polyol | 100 | 101 | 100 | 101 |
| Blending quantity (part(s) by mass) | | | | |
| Polyol a | 100 | | 100 | |
| Polyol c | | 100 | | |
| Polyol d | | | | 100 |
| Content ratio (×$10^6$) of compound having P=N bond to polyol in preparation (c) | 580 | 300 | 800 | 17 |
| Content ratio (×$10^6$) of antioxidant a to polyol in preparation (c) | 300 | 300 | 300 | 300 |
| Acid species | DBSA-L | oxalic acid | | |
| Content ratio (×$10^6$) of acid to polyol in preparation (c) | 70 | 50 | | |
| Acid/compound having P=N bond (mol/mol) | 0.2 | 1.4 | — | — |
| Coloring property test | | | | |
| First day of preparation | colorless and transparent | colorless and transparent | colorless and transparent | colorless and transparent |
| 24 hours after preparation (storage at 100° C.) | purple color and transparent | purple color and transparent | parple color and transparent | colorless and transparent |
| 28 days after preparation (storage at 50° C.) | purple color and transparent | purple color and transparent | purple color and transparent | colorless and transparent |

(1) Each content ratio was calculated from the charge.

The invention claimed is:

1. A composition for a polyurethane foam, comprising:
   (i) at least one polyol selected from a polyoxyalkylene polyol (p) obtained by addition polymerization of an alkylene oxide compound onto an active hydrogen compound using (ii) a compound having a P=N bond as a catalyst and a polymer polyol wherein polymer fine particles obtained by polymerizing a compound having an unsaturated bond are dispersed in the polyoxyalkylene polyol (p),
   (ii) the compound having a P=N bond,
   (iii) an antioxidant having a hydroxyphenyl group,
   (iv) an acid other than phosphoric acid, a salt of the acid other than phosphoric acid, or combinations thereof; the acid other than phosphoric acid being at least one acid selected from the group consisting of a sulfonic acid and an acid having a sulfuric acid ester group,
   (v) a catalyst for polyurethane foam production, and
   (vi) a blowing agent,
   wherein the molar ratio (a/b) of (a) the compound (iv) to (b) the compound (ii) is not less than 0.5 but not more than 4.0, and
   a content ratio of the compound (ii) to the polyoxyalkylene polyol (p) is 200 ppm or more and 5000 ppm or less.

2. The composition for a polyurethane foam as claimed in claim 1, wherein the compound (ii) is represented by the following formula (2) or represented by the following formula (4):

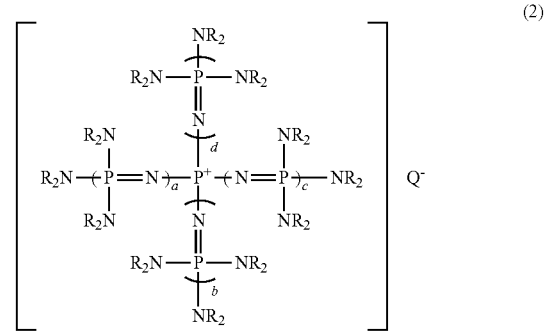

wherein a, b, c and d are each a positive number of 0 to 3 but there is no case where all of a, b, c and d become 0 at the same time, each R is the same or different hydrocarbon group of 1 to 10 carbon atoms and two R on the same nitrogen atom may be bonded to each other to form a cyclic structure, and $Q^-$ represents a hydroxyl anion, an alkoxy anion, an aryloxy anion or a carboxy anion,

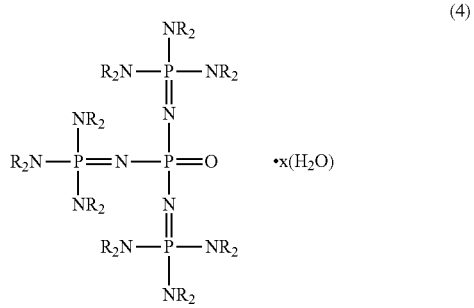

(4)

wherein each R is the same or different hydrocarbon group of 1 to 10 carbon atoms, and x is 0 to 5.

3. The composition for a polyurethane foam as claimed in claim 1, which comprises a preparation (c) for a polyurethane foam, the catalyst (v) and the blowing agent (vi), wherein:
the preparation (c) comprises the polyol (i), the compound (ii) having a P═N bond and having been used for the production of the polyol (p), the antioxidant (iii) and the acid other than phosphoric acid, salt, or combinations thereof (iv), and
the preparation (c) is obtained by adding the acid other than phosphoric acid, salt, or combinations thereof (iv) and the antioxidant (iii) to the polyol (i).

4. The composition for a polyurethane foam as claimed in claim 1, wherein the content ratio of the compound (ii) to the polyol (p) is 300 to 5000 ppm.

5. The composition for a polyurethane foam as claimed in claim 1, wherein the content ratio of the antioxidant (iii) in the composition for a polyurethane foam is 100 to 15000 ppm.

6. The composition for a polyurethane foam as claimed in claim 1, wherein the hydroxyl value of the polyoxyalkylene polyol is 10 to 80 mgKOH/g, the hydroxyl value of the polyoxyalkylene polyol of the polymer polyol is 10 to 80 mgKOH/g, and the hydroxyl value of the polymer polyol is 10 to 80 mgKOH/g.

7. A polyurethane foam obtained by reacting the composition for a polyurethane foam as claimed in claim 1 with polyisocyanate.

8. A polyurethane foam obtained by reacting the composition for a polyurethane foam as claimed in claim 3 with polyisocyanate.

9. A production process for a composition for a polyurethane foam, comprising a step which comprises adding, to a polyol (i) containing a polyoxyalkylene polyol (p) obtained by addition polymerization of an alkylene oxide compound onto an active hydrogen compound using a compound (ii) having a P═N bond as a catalyst, and the compound (ii) having been used for the production of the polyol (p), an antioxidant (iii) having a hydroxyphenyl group and an acid, a salt of the acid, or combinations thereof (iv) wherein component (iv) is present in such an amount that the molar ratio (a/b) of (a) the acid, salt, or combinations thereof (iv) to (b) the compound (ii) having a P═N bond is not less than 0.5 but not more than 4.0, to obtain a preparation (c) for a polyurethane foam and then adding a catalyst (v) for polyurethane foam production and a blowing agent (vi) to the preparation (c), wherein:
the acid is at least one acid selected from the group consisting of a sulfonic acid and an acid having a sulfuric acid ester group, and
a content ratio of the compound (ii) to the polyoxyalkylene polyol (p) is 200 ppm or more and 5000 ppm or less.

10. The production process for a composition for a polyurethane foam as claimed in claim 9, which comprises a step of preparing a polymer polyol in the preparation (c), wherein:
the polymer polyol is obtained by dispersing polymer fine particles obtained by polymerizing a compound having an unsaturated bond in the preparation (c).

11. The production process for a composition for a polyurethane foam as claimed in claim 9, wherein the compound (ii) is represented by the following formula (2) or represented by the following formula (4):

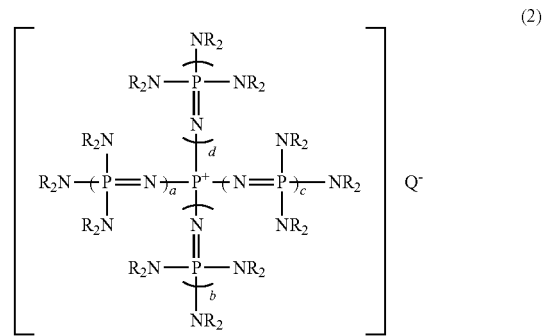

(2)

wherein a, b, c and d are each a positive number of 0 to 3 but there is no case where all of a, b, c and d become 0 at the same time, each R is the same or different hydrocarbon group of 1 to 10 carbon atoms and two R on the same nitrogen atom may be bonded to each other to form a cyclic structure, and $Q^-$ represents a hydroxyl anion, an alkoxy anion, an aryloxy anion or a carboxy anion,

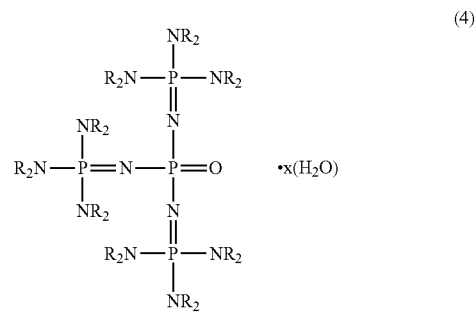

(4)

wherein each R is the same or different hydrocarbon group of 1 to 10 carbon atoms, and x is 0 to 5.

* * * * *